(12) United States Patent
Muchow et al.

(10) Patent No.: US 7,230,819 B2
(45) Date of Patent: Jun. 12, 2007

(54) MOBILE POWER SYSTEM

(75) Inventors: David J. Muchow, Arlington, VA (US); George F. Bockelmann, Vienna, VA (US); Michael C. Hull, Rockville, MD (US); Charles J. Bigelow, Round Hill, VA (US)

(73) Assignee: SkyBuilt Power, LLC, Arlington, VA (US)

( * ) Notice: Subject to any disclaimer, the term of this patent is extended or adjusted under 35 U.S.C. 154(b) by 327 days.

(21) Appl. No.: 10/661,816

(22) Filed: Sep. 15, 2003

(65) Prior Publication Data

US 2004/0124711 A1    Jul. 1, 2004

Related U.S. Application Data

(60) Provisional application No. 60/410,300, filed on Sep. 13, 2002.

(51) Int. Cl.
*H02B 1/00* (2006.01)
*H02B 1/48* (2006.01)
*H02J 3/00* (2006.01)

(52) U.S. Cl. ............... 361/601; 307/22; 307/26; 307/72; 361/825

(58) Field of Classification Search ........... 307/72; 320/101
See application file for complete search history.

(56) References Cited

U.S. PATENT DOCUMENTS

| | | | | |
|---|---|---|---|---|
| 4,261,329 A | | 4/1981 | Walsh et al. .......... 126/417 |
| 4,421,943 A | | 12/1983 | Withjack ............. 136/246 |
| 4,633,767 A | | 1/1987 | Sain ...................... 98/6 |
| 5,111,127 A | * | 5/1992 | Johnson ............... 320/101 |
| 5,184,502 A | | 2/1993 | Adams et al. .......... 73/31.01 |
| 5,338,369 A | | 8/1994 | Rawlings .............. 136/246 |
| 5,350,138 A | * | 9/1994 | Culbertson et al. ..... 244/159.6 |
| 5,969,501 A | | 10/1999 | Glidden et al. ......... 320/101 |
| 6,380,481 B1 | | 4/2002 | Müller ................. 136/291 |
| 6,396,239 B1 | | 5/2002 | Benn et al. ........... 320/101 |
| 6,426,606 B1 | * | 7/2002 | Purkey ................ 320/103 |

(Continued)

FOREIGN PATENT DOCUMENTS

DE    34 05 466 A1    8/1985

(Continued)

OTHER PUBLICATIONS

"STS-75", http://science.ksc.nasa.gov/shuttle/missions/sts-75/mission-sts-75.html, 1996.*

(Continued)

*Primary Examiner*—Stephen W. Jackson
*Assistant Examiner*—Hal I. Kaplan
(74) *Attorney, Agent, or Firm*—Finnegan, Henderson, Farabow, Garrett & Dunner, LLP

(57) ABSTRACT

A mobile power system for producing power at a desired location includes a first power generating device of a first type coupled to a transportable housing, and a second power generating device of a second type coupled to the transportable housing. The first type of power generating device is different than the second type of power generating device. According to an exemplary embodiment, the mobile power system may provide easy access to different types of power outputs. Further, the housing may have the approximate size of a standard freight container.

37 Claims, 15 Drawing Sheets

U.S. PATENT DOCUMENTS

| | | | |
|---|---|---|---|
| 6,783,032 B2 * | 8/2004 | Fons | 222/148 |
| 2002/0121781 A1 | 9/2002 | Douglas | 290/55 |
| 2003/0230934 A1 * | 12/2003 | Cordelli et al. | 307/43 |
| 2006/0137348 A1 * | 6/2006 | Pas | 60/641.1 |

FOREIGN PATENT DOCUMENTS

| | | |
|---|---|---|
| DE | 196 46 612 C1 | 3/1998 |
| DE | 93 21 520 U1 | 9/1999 |
| DE | 100 00 874 A1 | 7/2001 |
| EP | 0 237 445 | 9/1987 |
| EP | 0 240 962 A1 | 10/1987 |
| ES | 2119687 | 10/1998 |
| FR | 2 614 368 A1 | 10/1988 |
| GB | 2 158 219 A | 11/1985 |
| JP | 09195534 | 7/1997 |
| WO | WO 94/20802 | 9/1994 |
| WO | WO 03/008803 A1 | 1/2003 |

OTHER PUBLICATIONS

Linda Hales, "FutureShack: A Home for the Displaced," The Washington Post, May 15, 2004, at C2.

* cited by examiner

MOBILE POWER SYSTEM

This application claims the benefit of U.S. Provisional Application No. 60/410,300, filed Sep. 13, 2002.

TECHNICAL FIELD

This invention relates generally to power systems, and more particularly to mobile, self contained, power systems.

BACKGROUND

While electric power from traditional electrical power grids is readily available in many locations throughout the world, there remain vast regions where no electric power is available. Even in locations where electric power is available, there is a variety of situations where a supplemental or substitute power source would be desirable.

Solar and wind power generation systems are known and may be applied in many different applications. Traditional solar and wind power generation systems, however, have several shortcomings. For example, these systems generally have not been standardized. As a result, they must be custom built for each particular application and/or at each desired site, which makes these systems expensive. Custom built solar and wind power systems typically require days to assemble or disassemble. Further, traditional solar and wind power systems are not modular. Specifically, once a particular solar or wind power generator system has been designed and manufactured to include a certain number of power generating devices (such as photovoltaic or wind turbine devices), additional devices may not be added to the system without significant difficulty including, for example redesign and modification of the power system and/or redesign and modification of the power generation system site.

Additionally, conventional power generating systems generally are not designed for efficient transportation to a desired location, and are difficult to disassemble and remove once they have been constructed at the desired location. Many power generating systems are transported in a piecemeal fashion from a number of different manufactures or retailers. The components are then assembled and coupled to preexisting housing structures or to specialized housing structures constructed at the desired location of the power generating system.

Conventional power generation systems also do not provide adequate versatility for receiving power from different types of power generating devices, and for supplying power to a variety of different power receiving devices requiring different types electrical supply. Many power generation systems are designed with a single type of power generating device (such as diesel powered or wind powered generator) supplying power directly to one or more power receiving device. Accordingly, interchanging power receiving devices from the power generating device is difficult or impossible in existing power generating systems.

The present invention provides a power generating system that avoids some or all of the aforesaid shortcomings in the prior art.

SUMMARY OF THE INVENTION

In accordance with one aspect of the invention, a method of producing and delivering power at a desired location includes coupling a first power generating device of a first type to a transportable housing, and coupling a second power generating device of a second type to the transportable housing, wherein the first type of power generating device is different than the second type of power generating device. The method further includes receiving power from at least one of the first and second power generating devices within the transportable housing, and providing access to the received power in a plurality of different electrical configurations.

According to another aspect of the present invention, a method of producing power at a desired location includes coupling a first power generating device of a first type to a transportable housing, and coupling a second power generating device of a second type to the transportable housing, wherein the first type of power generating device is different than the second type of power generating device.

According to yet another aspect of the present invention, a transportable power station includes a transportable housing and a plurality of coupling elements secured to the housing and configured to allow for the attaching of more than one type of power generating device to the housing.

According to yet another aspect of the present invention, a method of transporting and assembling a power station includes storing at least one power generating device within a housing and transporting the housing to a desired location. The method further includes removing the at least one power generating device from the housing, and coupling the at least one power generating device to an outer surface of the housing.

According to another aspect of the present invention, a transportable power station includes a transportable housing; and at least one power generating device removably coupled from an operational position on an outside surface of the housing and sized to fit completely within the transportable housing.

According to another aspect of the present invention, a method of manufacturing a transportable power station includes adapting a housing to removably receive at least one power generating device thereon, the housing having a top wall, side walls and a bottom wall, a length of approximately 20 feet, a width of approximately 8 feet, and a height of approximately 8.5 feet or less, and an interior space capable for use as a human shelter.

According to another aspect of the present invention, a transportable power station includes a transportable housing having the approximate size of a standard ISO freight container, and at least one power generating device coupled to the housing.

DETAILED DESCRIPTION

Reference will now be made in detail to the drawings. Wherever possible, the same reference numbers will be used throughout the drawings to refer to the same or like parts.

Figure 1:
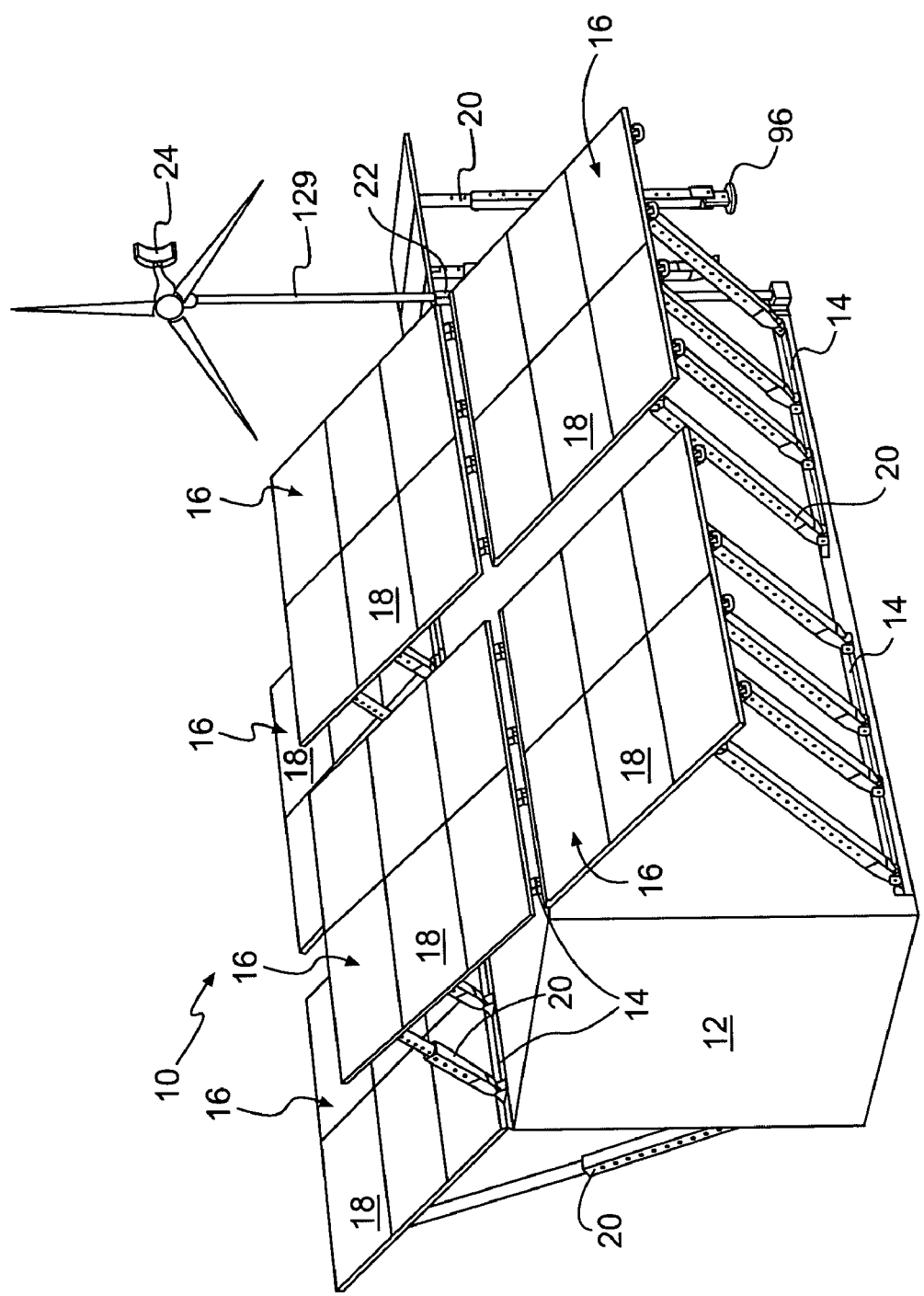
FIG. 1 illustrates a perspective view of a mobile power system according to an embodiment of the present disclosure.

FIG. 1 illustrates a mobile power system 10 according to the present disclosure. The mobile power system 10 may include a housing 12 and one or more brackets 14 coupled to the housing 12. Solar powered generating devices 16 in the form of solar panel arrays 18 may be coupled at one end to respective brackets 14 and at another end to adjustable strut assemblies 20. The adjustable strut assemblies may also be coupled to a respective bracket 14, or may extend to the ground adjacent the housing 12. Further, one or more pole assemblies 22 may be mounted vertically to a corner or corners of the housing 12 for supporting, for example, a wind powered generating device 24, or antenna or lights.

Figure 2:
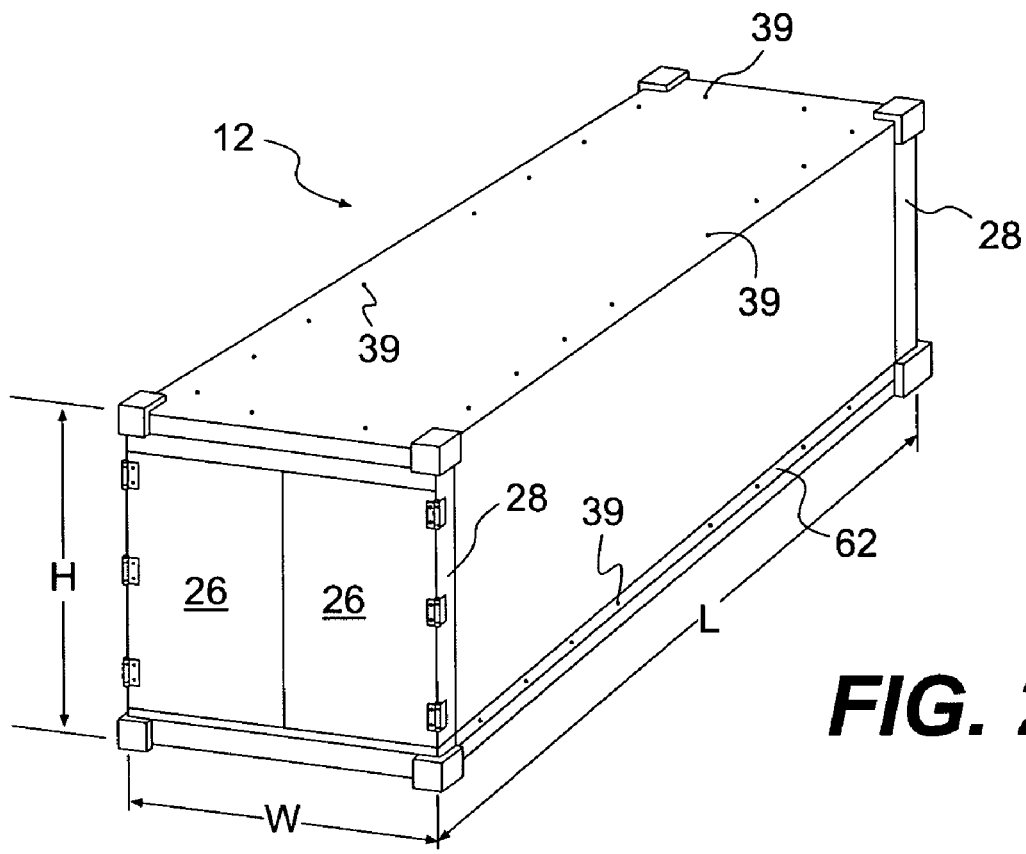
FIG. 2 illustrates a perspective view of the housing of the mobile power system of FIG. 1.

The housing 12 of the mobile power system 10 is illustrated in FIG. 2 prior to assembly of the mobile power system 10. The housing 12 may include an ISO (International Organization for Standardization) standard freight or shipping container. For example, the housing 12 may include an ISO Series 1 General Cargo Container having a rectangular shape and a length (L) of approximately 20 feet (6.1 meters), a width (W) of approximately 8 feet (2.4 meters), and a height (H) of approximately 8 feet, 6 inches (2.6 meters) or less. Such standard ISO containers are widely used in the shipping industry for transporting items by ship, rail, airplane, or truck. Alternative standard ISO freight containers may include containers having a length (L) of approximately 40 feet (12.2 meters), a width (W) of approximately 8 feet (2.4 meters), and a height (H) in the range of approximately 9 feet, 6 inches (2.9 meters) to less than 8 feet (2.4 meters); a length (L) of approximately 30 feet (9.1 meters), a width (W) of approximately 8 feet (2.4 meters), and a height (H) in the range of approximately 9 feet, 6 inches (2.9 meters) to less than 8 feet (2.4 meters); a length (L) of approximately 10 feet (6.1 meters), a width (W) of approximately 8 feet (2.4 meters), and a height (H) in the range of approximately 8 feet (2.4 meters) or less.

The housing 12 may include a door or doors 26 for allowing access to the interior compartment of the housing 12. Further, housing 12 in the form of a standard ISO container may include thick support pillars 28 arranged vertically at each corner of the housing 12. Support pillars 28 provide structural integrity for the housing 12, allow the containers to be stacked and easily moved, and serve as convenient attachment points for various components of the mobile power system 10.

While FIGS. 1 and 2 illustrate one particularly-sized housing 12, the housing 12 of the mobile power system 10 may have any of a plurality of different sizes and shapes, or be formed of a different size of standard ISO freight container. As will be further discussed below, according to one exemplary embodiment of the present disclosure, the housing 12 should be of a sufficient size to allow for all of the exterior and interior components of the mobile power system 10 to be stored within the interior compartment of the housing 12. The exterior components of the mobile power system 10 may include, but are not limited to, the brackets 14, solar powered generating devices 16, adjustable strut assemblies 20, pole assemblies 22, and wind powered generating devices 24. Further according to an exemplary embodiment, the housing 12 should be of a sufficient size to allow the housing 12 to be used as a human shelter, such as an emergency operations center, medical facility, office, or dwelling. Additionally, the housing 12 may be a non-standard, custom-sized housing.

Figure 3:
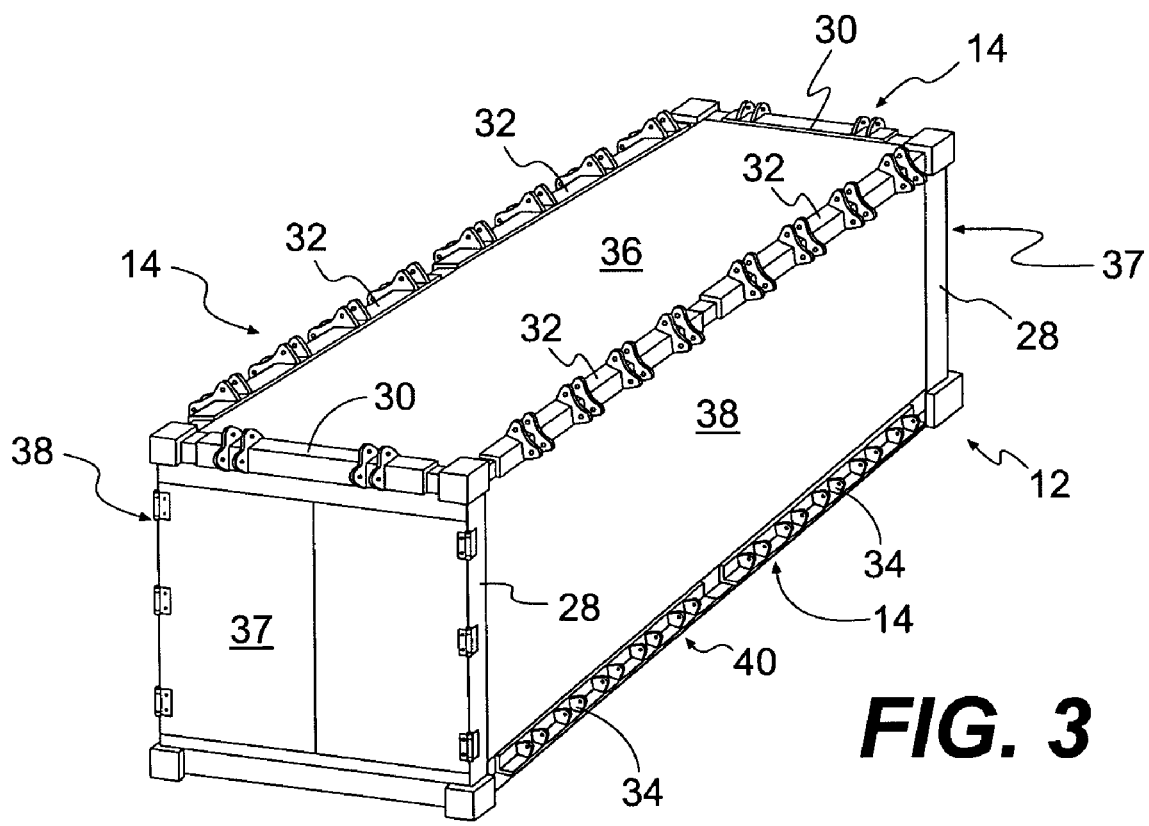
FIG. 3 illustrates another perspective view of the housing of the mobile power system of FIG. 1.

FIG. 3 illustrates the housing 12 with brackets 14 mounted thereon. Brackets 14 may include one or more top mounted end brackets 30, one or more top mounted side brackets 32, and one or more bottom mounted side brackets 34. As shown in FIG. 3, the housing 12 may include a single top mounted end bracket 30 located at each end of the housing 12 at a junction between a top surface 36 and an end surface 37 of the housing 12. The housing may also include two top mounted side brackets 32 attached to each side of the housing 12 at a junction between the top surface 36 and a side surface 38 of the housing 12. Further, the housing 12 may include two bottom mounted side brackets 34 mounted on each side of the housing 12 on the side surfaces 38 adjacent a bottom surface 40 of the housing. The brackets 14 are removably coupled to the housing 12, by way of, for example, bolt connections extending through the brackets 14 and into appropriately located passages 39 (FIG. 2) in the housing 12. It is understood that the brackets 14 may be coupled to the housing in any conventional manner, and may form a removable or permanent connection.

Figure 4A:
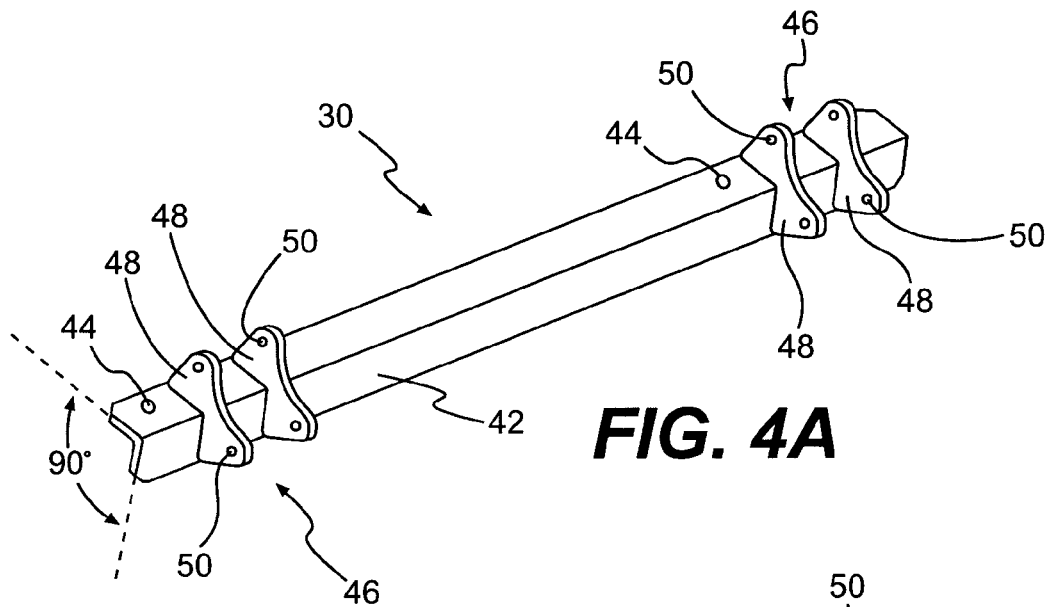
FIG. 4A illustrates a top mounted end bracket according to an embodiment of the present disclosure.
Figure 4B:
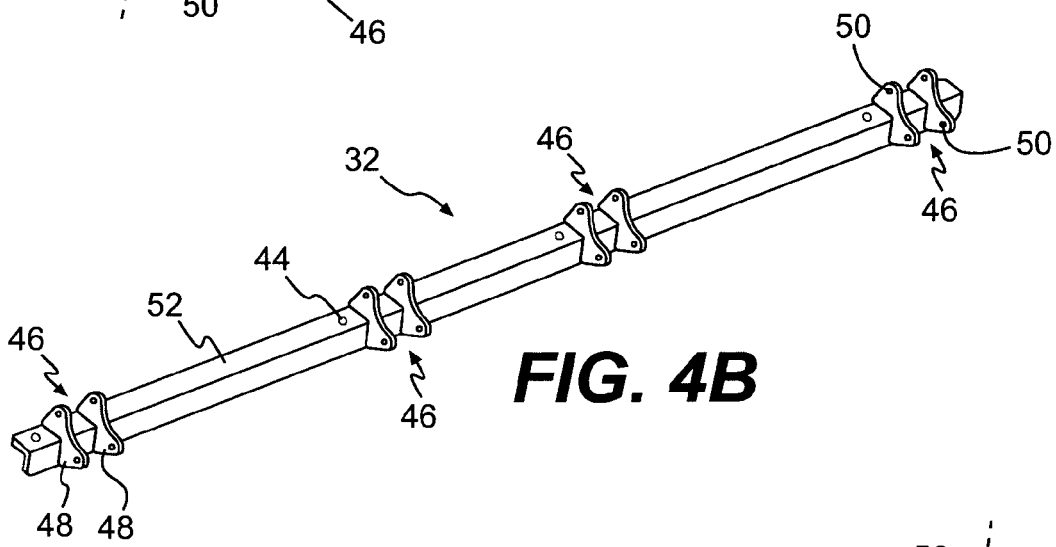
FIG. 4B illustrates a top mounted side bracket according to an embodiment of the present disclosure.
Figure 4C:
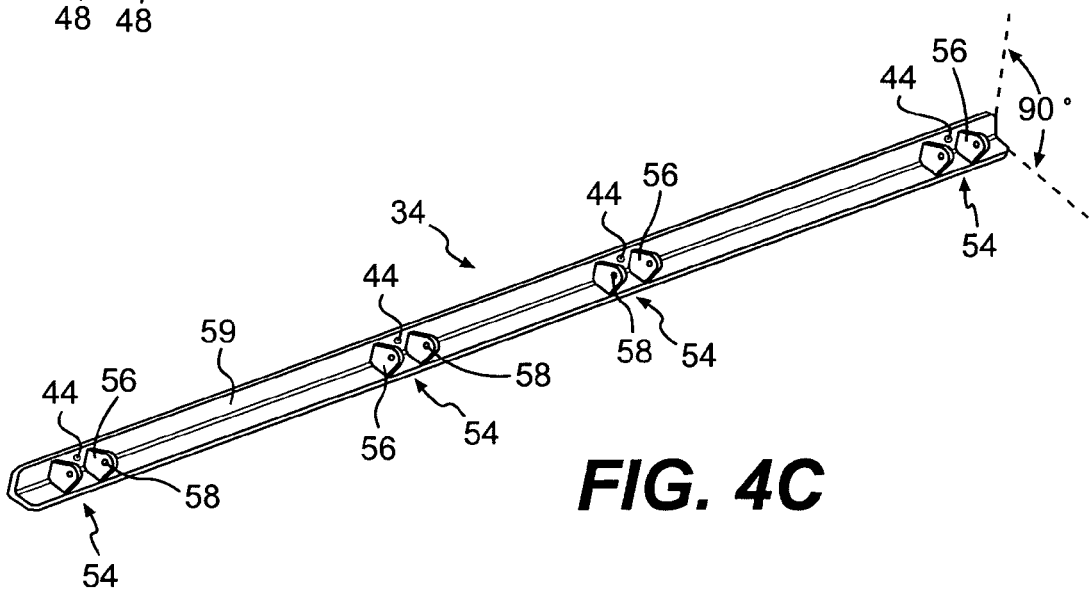
FIG. 4C illustrates a bottom mounted side bracket according to an embodiment of the present disclosure.

FIGS. 4A-4C illustrate exemplary configurations for the brackets 14. The top mounted end bracket 30 is illustrated in FIG. 4A and may include a base portion 42 forming a 90 degree bend. The 90 degree bend allows for mating engagement with the junction of the top surface 36 and end surface 37 of the housing 12. One or more passages 44 may extend through the base portion 42, the passages 44 being sized to receive the bolt connections for securing the top mounted end bracket 30 to the housing 12. The top mounted end bracket 30 may also include a series of connectors 46 located on a side of the base portion 42 opposite the 90 degree bend. Connectors 46 may include a pair of flanges 48 extending perpendicular to the base portion 42. One or more flange passages 50 may extend through each of the flanges 48. As illustrated in FIG. 4A, the top mounted end bracket 30 includes two flange passages 50 extending through each flange 48. As will be discussed in more detail below, connectors 46 are configured to receive mating connectors of the solar panel array 18. It is understood that the top mounted end bracket 30 could be formed in alternative sizes and shapes, and could include more or less connectors 46.

The exemplary top mounted side bracket 32 illustrated in FIG. 4B includes the same components described above with respect to the top mounted end bracket 30. The base portion 52 of the top mounted side bracket 32, however, is longer than the base portion 42 of the top mounted end bracket 30. The longer base portion 52 allows for the inclusion of a greater number of connectors 46. As illustrated in FIG. 4B, top mounted side bracket 32 may include four connectors 46.

The exemplary bottom mounted side bracket 34 illustrated in FIG. 4C is similar to the above described top mounted side bracket 32, except that the connectors 54 include flanges 56 having only a single passage 58, and the connectors 54 are located within the 90 degree bend formed by the base portion 59. The orientation of the 90 degree bend allows the bottom mounted side bracket 34 to be coupled against a bottom flange 62 (FIG. 2) of the housing 12. Again, it is noted that the top mounted end brackets 30, the top mounted side brackets 32, and the bottom mounted side brackets 34 may be formed in a variety of different shapes and sizes other than those illustrated in FIGS. 4A-4C while providing a secure connection between housing 12 and a component of the mobile power system 10 coupled to the connectors 46, 54.

Figure 5:
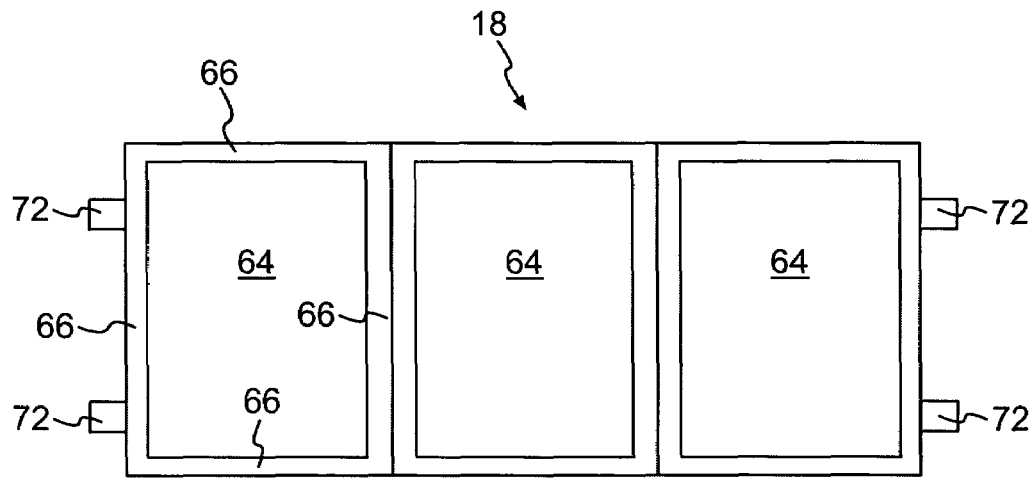
FIG. 5 illustrates a top view of a solar panel array according to an embodiment of the present disclosure.

FIG. 5 illustrates a top view of an exemplary solar panel array 18 of the solar powered generating device 16 (FIG. 1) of the mobile power system 10. The solar panel array 18 may include a plurality of photovoltaic devices 64 of any conventional configuration for converting solar energy to electrical energy. The photovoltaic devices 64 may be formed in any conventional shape, such as the flat, rectangular solar panel shape illustrated in FIGS. 5 and 6. Further, a support frame 66 may be included around the edges of each of the photovoltaic devices 64.

A plurality of the photovoltaic devices 64 may be coupled together in any conventional manner to form the solar panel array 18. For example, as illustrated in FIG. 5, the support frames 66 of three photovoltaic devices 64 may be fastened together in any conventional manner, for example, by a welded or bolted connection. Alternatively, the solar panel array 18 may be formed by-individual insertion of the photovoltaic devices 64 (framed or unframed) into a structure forming a boundary of the solar panel array 18. Additionally, any number of reinforcing members 67 may extend across the photovoltaic devices 64 to increase the load bearing characteristics of the solar panel array 18.

Figure 6:
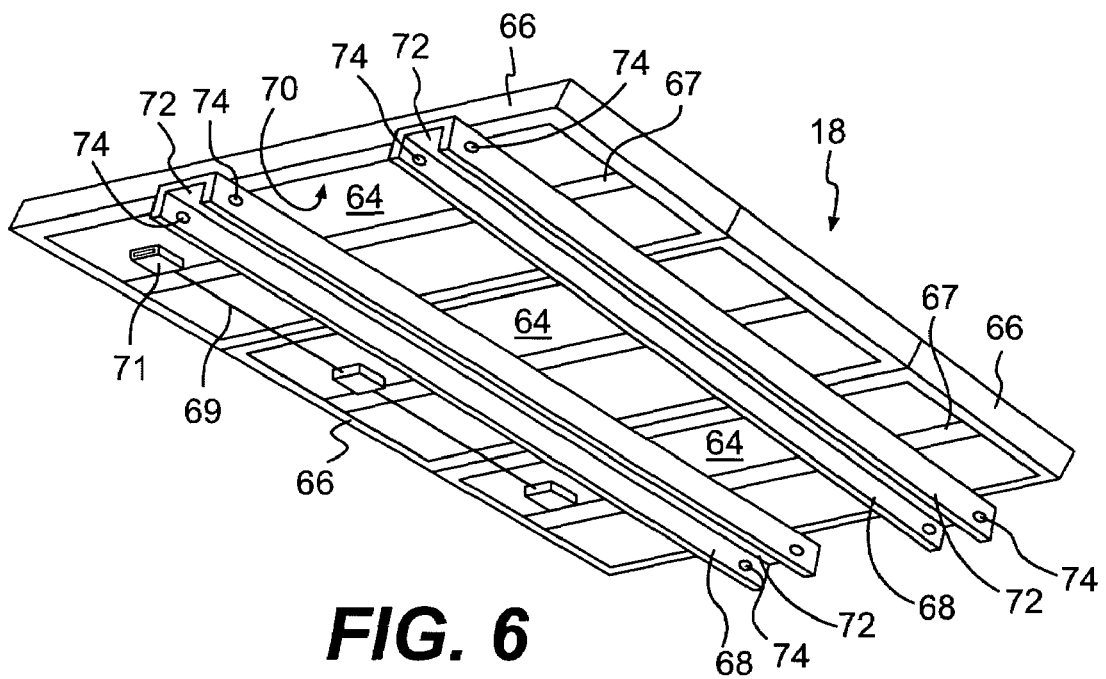
FIG. 6 illustrates a perspective bottom view of the solar panel array of FIG. 5.

Appropriate electrical connections are provided for electrically coupling the photovoltaic devices 64 together and allowing for the connection thereto of a unitary power output cord for an input to the housing 12. For example, as illustrated in FIG. 6, the three photovoltaic devices 64 may be hardwired together through electrical lines 69 so that the solar panel array 18 includes a single electrical coupling member 71, such as a female connector, configured to receive a mating electrical coupling member (not shown) of a power output cord connected between the solar panel array 18 and the housing 12. Alternatively, each photovoltaic device 64 of the solar panel array 18 may include its own power output cord connecting to the housing 12. The power output cord(s) extending from the each of the solar panel arrays 18 may be combined together at one or more connection boxes 73 (FIG. 16) coupled to an exterior surface of the housing 12.

As illustrated in FIG. 6, one or more support members 68 may be coupled to a bottom surface 70 of the solar panel array 18. The support members 68 may be removably or permanently coupled to the bottom surface 70 in any conventional manner. Further, support members 68 may themselves form the coupling component connecting the photovoltaic devices 64. The support member 68 may be configured as a "C" shaped beam having end portions 72 extending beyond the ends of the outer located photovoltaic devices 64. One or more passages 74 may extend through the end portions 72 of each support member 68. As will be described in more detail below, the passages 74 of the support members 68 assist in coupling the solar panel array 18 to the connectors 46, 54 of the brackets 14 (FIGS. 4A-4C).

Figure 7:
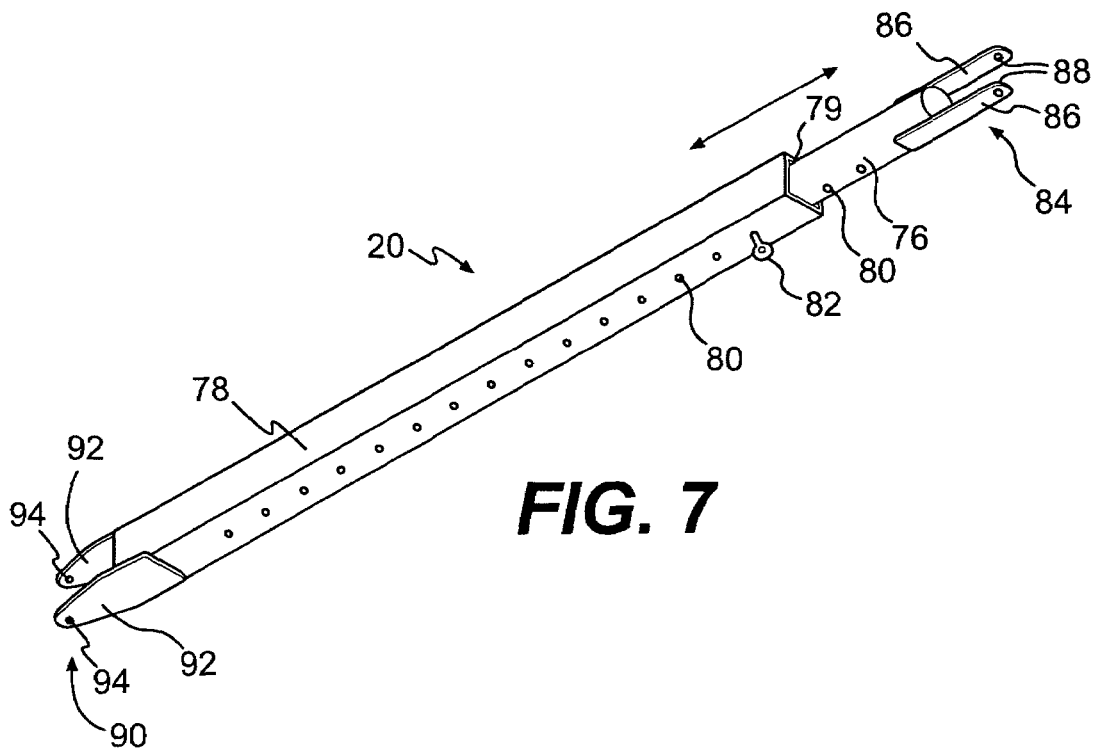
FIG. 7 illustrates an adjustable strut assembly according to an embodiment of the present disclosure.

FIG. 7 illustrates an exemplary adjustable strut assembly 20 of the mobile power system 10. The adjustable strut assembly 20 may include an inner tubular member 76 and an outer receiving member 78. Outer receiving member may have a square cross-section shape and an open end 79 for receiving an end of the inner tubular member 76 so as to allow for telescoping movement between the elements. Adjustment passages 80 may be formed in each of the inner tubular member 76 and the outer receiving member 78 so that a pin member 82 can be inserted into the adjustment passages 80 to secure the inner tubular member 76 to the outer receiving member 78, and thereby fix the adjustable strut assembly 20 at a desired length.

The inner tubular member 76 of the adjustable strut assembly 20 further includes an end portion 84 having one or more coupling arms 86. Each of the coupling arms 86 may include at least one coupling passage 88. The outer receiving member 78 also includes an end portion 90 having one or more coupling arms 92. As with the inner tubular member 76, the coupling arms 92 of the outer receiving member 78 each include at least one passage 94 extending therethrough. As will be described in more detail below, coupling arms 86 and 92 may assist in connecting the solar panel array 18 to the brackets 14, or to a foot member 96 to be described below (FIG. 1 and FIG. 8).

It is understood that the adjustable strut assembly 20 may be formed in many alternative configurations. For example, outer receiving member 78 may be formed as a tubular member, or inner tubular member 76 may be formed with a square cross-section shape. Further, inner tubular member 76 and outer receiving member 78 may provide for an adjustable length with a structure other than the telescoping connection with pin member 82. The adjustable strut assembly, like many of the components of the mobile power system, may be made from various materials, including, for example, steel or other metals, carbon fiber, structural polymers, and/or pultrusion materials.

Figure 8:
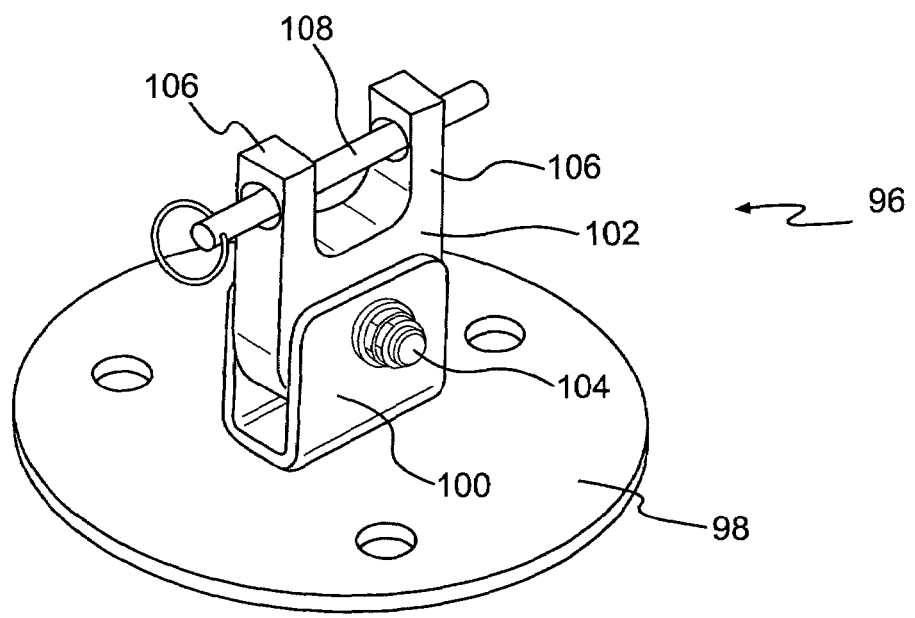
FIG. 8 illustrates a foot member according to an embodiment of the present disclosure.

FIG. 8 illustrates an exemplary embodiment of the foot member 96 of the mobile power system 10. Foot member 96 may include a disc shaped base portion 98 having a "C" shaped flange 100 extending normal to the base portion 98. Flange 100 may be pivotably connected to a foot connector 102 by way of a bolt connection 104 extending through the flange 100 and foot connector 102. Foot connector 102 may include one or more arms 106 forming a pin connection 108 for coupling with an end portion 84, 90 of the adjustable strut assembly 20. It is understood that the shape of base portion 98 may be other than circular, that the flange 100 and foot connector 102 may be connected by alternative pivotable connections, such as a ball and socket connection, and that foot connector 102 may use a connection configuration other than the pin connection 108.

Figure 9:
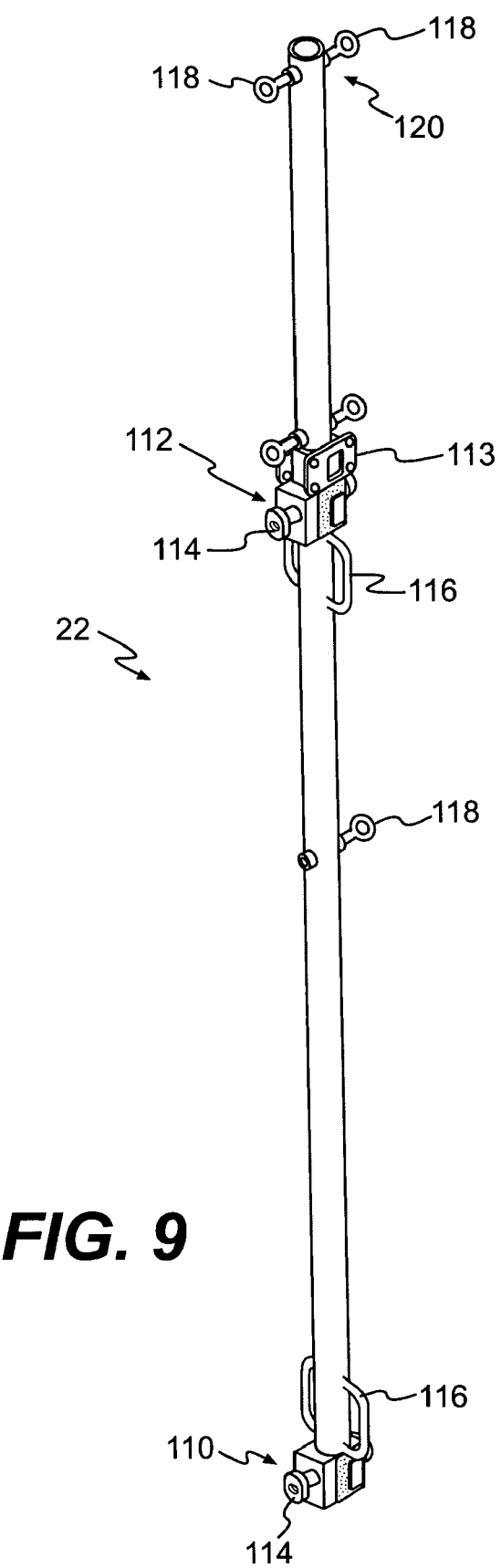
FIG. 9 illustrates a pole assembly according to an embodiment of the present disclosure.

FIG. 9 illustrates an exemplary vertical pole assembly 22 of the mobile power system 10. Pole assembly 22 may be a hollow cylindrical member having a length approximately equal to the height (H) of the housing 12 (FIG. 2). Pole connection assemblies 110, 112 may be included on the pole assembly 22 for connecting the pole assembly 22 to the housing 12. Pole connection assemblies 110, 112 may include a rotatable cam member 114 for insertion into, and locking against, corresponding passages formed in the housing 12. Pole assembly 22 may also include handle members 116, equipment mounts 113 having bolt holes extending therethrough, and one or more eyebolt connectors 118 located a various positions along the pole assembly 22. Further, pole assembly 22 may include an open top end portion 120 adapted for directly receiving a pole extension 129 (FIG. 1) and wind powered generating device 24, or alternative components, or for receiving a pivot connector 121 (FIG. 13) configured to assist in coupling a pole extension 129 and wind powered generating device 24, or alternative components, to the pole assembly 22. Alternative components that may be coupled to the end portion 120 of the pole assembly include, for example, telecommunications equipment, speakers, lights, radar, flagpoles, video equipment, extension poles, and/or electrical or cable television equipment.

Assembly of the above described components to the housing 12 of the mobile power system 10 will now be described. In accordance with an exemplary embodiment of the present disclosure, interior and exterior components of the mobile power system may all be stored within the housing 12 during transport of the mobile power system 10 to a desired location.

As noted above, housing 12 may be in the form of a standard ISO freight container. Using a standard ISO freight container as the housing 12 of the mobile power system 10 provides many benefits. For example, using a standard ISO freight container provides access to the numerous worldwide transportation systems that are designed to facilitate movement of such standard containers throughout the world. When it is moving through the transportation systems it can serve as a stealth biohazard or other detection station, detecting biohazards or other hazards in the other containers around it. This is done by having all or most of its power supplies, communications systems and detection devices contained within the housing so that they can perform this role unnoticed and undetected. Additionally, the use of a standard ISO freight container for the housing 12 provides a sturdy, protective structure for storage of the interior and exterior components of the mobile power system 10 during transportation. In addition, the housing 12 protects interior components, equipment, and humans from the environment once the mobile power system 10 has been delivered to a desired location. Further, the size and weight of the standard ISO freight container protects against unintended movement of the housing 12, be it by weather forces or human influence. Finally, the sturdy, secure construction of a standard ISO freight container provides protection against vandalism and theft of interior components of the mobile power system 10.

In order to take advantage of the numerous benefits of using a standard ISO freight container as the housing 12 of the mobile power system 10, it is understood that the container should be designed to allow for rapid assembly and disassembly of the exterior components to and from the housing 12, while not altering or modifying the housing 12 so that it no longer conforms to the appropriate standards for shipping. Accordingly, housing 12 may be configured to allow for a shipping condition where all of the exterior components are removed from the housing 12. For example, housing 12 may include a number of holes or passages (e.g. passages 39 (FIG. 2)) for assisting in connecting the exterior components to the housing 12, and otherwise does not include any other additional components when in the shipping condition. One or more of the passages formed in housing 12 may include rivnut connectors, and/or may include removable caps or covers covering the passages during transportation of the mobile power system.

Figure 10:
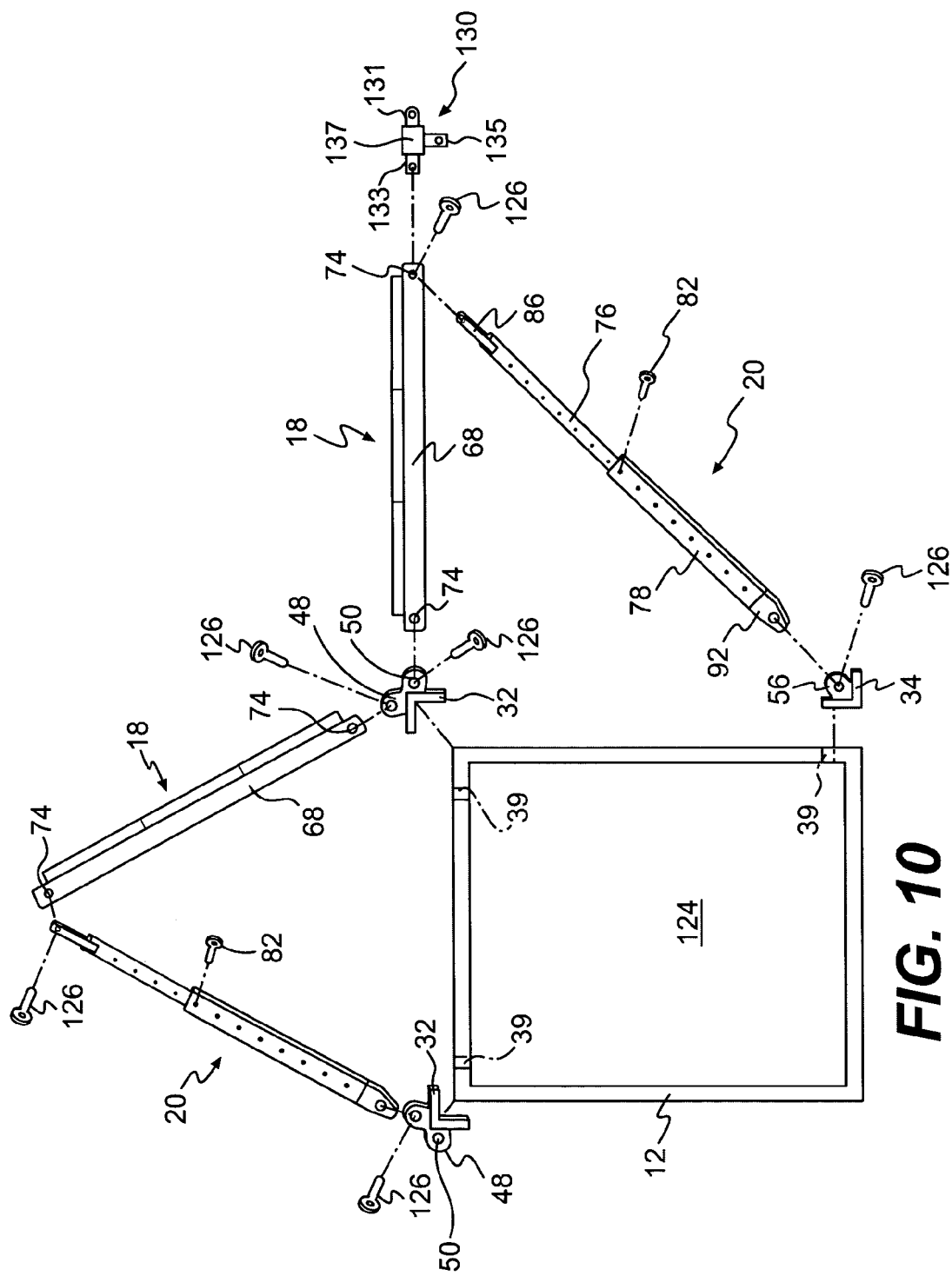
FIG. 10 illustrates an assembly view of portions of the mobile power system of FIG. 1.

FIG. 10 illustrates the assembly of two solar panel arrays 18 to the housing 12 of the mobile power system 10. Once the housing 12 has been delivered and secured at the desired location, the brackets 14, preassembled solar panel arrays 18, adjustable strut assemblies 20, and various connectors are removed from the interior compartment 124 of the housing 12. First, the top mounted side bracket 32 and bottom mounted side bracket 34 are coupled to the housing 12. As noted above, this may be achieved by bolt connections (not shown) extending though brackets 32, 34 and into holes 39 in the housing 12.

With the brackets 32, 34 secured to the housing 12, one end of solar panel arrays 18 may be coupled to the top mounted side bracket 32. This connection may include coupling one end of support member 68 of the solar panel array 18 to the flanges 48 of the top mounted side bracket 32. In particular, the passages 74 extending through the support member 68 may be aligned with the passages 50 of the flanges 48 and secured by placement of a locking pin 126 through the aligned passages 74 and 50. Such a connection allows the solar panel array 18 to pivot with respect to the housing 12.

Next, adjustable strut assembly 20 is coupled to the housing 12 and to the uncoupled end of the solar panel assembly 18. With respect to the side solar panel array 18 illustrated in FIG. 10, this coupling is achieved by connecting the coupling arms 92 of the outer receiving member 78 to the flanges 56 of the bottom mounted side bracket 34 by way of locking pin 126. Further, coupling arms 86 of inner tubular member 76 are coupled to support member 68, again by way of a locking pin 126 and passages 74 of support member 68. The length of the adjustable strut assemblies 20 may be selected and fixed by way of pin member 82, so as to adjust the angle at which the solar panel array 18 extends from the housing 12. Once the solar panel arrays 18 are mechanically coupled to the housing 12, they may be electrically coupled to the housing 12. Power output cords (not shown) of the solar panel arrays 18 may be coupled together prior to connection to the housing, or may be individually connected to the housing 12 in any conventional manner, for example, by way of a plug in connection to be described below in connection with FIG. 17.

In an alternative coupling arrangement, the coupling arms 92 of the outer receiving member 78 may be coupled to a foot member 96 (FIGS. 1 and 8). In this alternative arrangement, adjustable strut assembly 20 would extend generally vertically from the ground to support the solar panel array 18. The pivotable foot connector 102 of the foot member 96 allows the base portion 98 thereof to remain flush with the ground even when the adjustable strut assembly 20 is not extending in a completely vertical direction.

It is understood that the top solar panel array 18 shown in FIG. 10 would be coupled in the same manner described above with respect to the side mounted solar panel array 18, except that the coupling arms 92 of the outer receiving member 78 would be coupled to a top mounted side bracket 32, rather than a bottom mounted side bracket 34. It is further understood that other solar panel arrays 18 would be mounted to the housing 12 in a similar manner. It is noted that many of the exterior components of the mobile power system 10 may be configured to be interchangeable. For example, each of the solar panel arrays 18, adjustable strut assemblies 20, locking pins 126, and foot members 96 may be identical in construction, and thus interchangeable.

Figure 11:
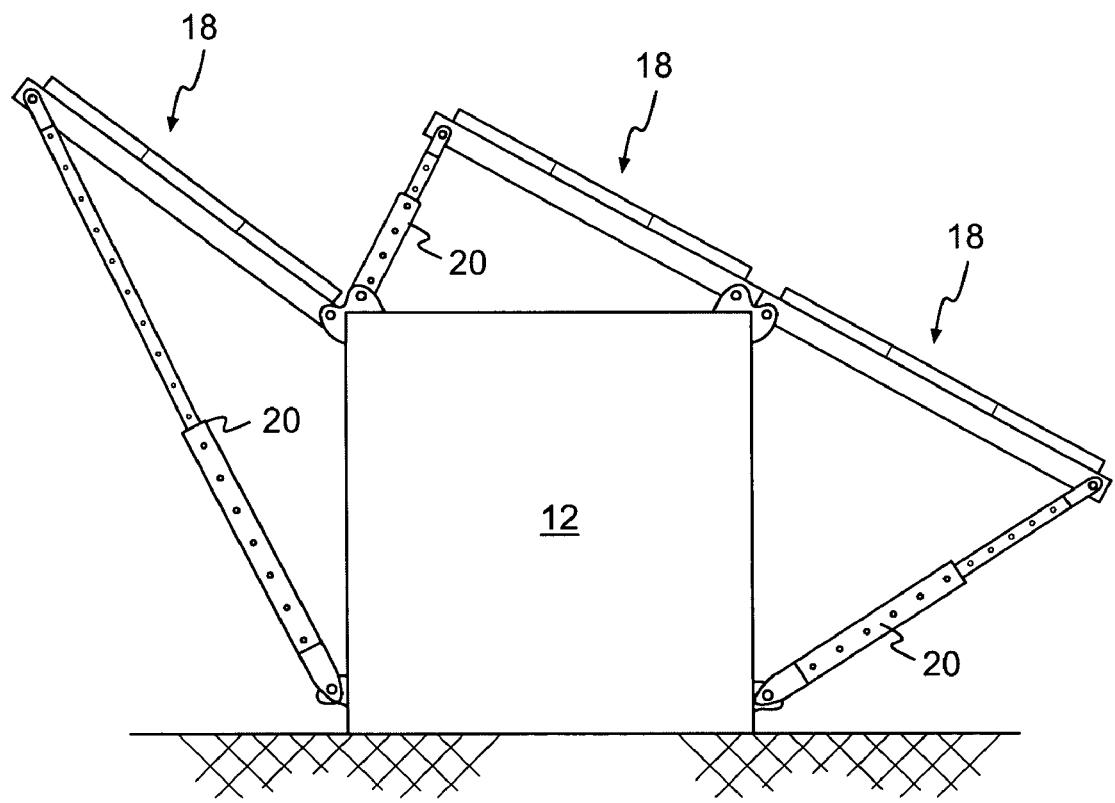
FIG. 11 illustrates an end view of a mobile power system according to an embodiment of the present disclosure.

FIG. 11 illustrates an end view of the mobile power system 10 with the solar panel arrays 18 at a desired angular orientation. The angular orientation of the solar panel arrays 18 may be adjusted to a variety of different positions, but is limited by the length of the adjustable strut assembly 20 and any obstacles, such as the ground.

Figure 12:
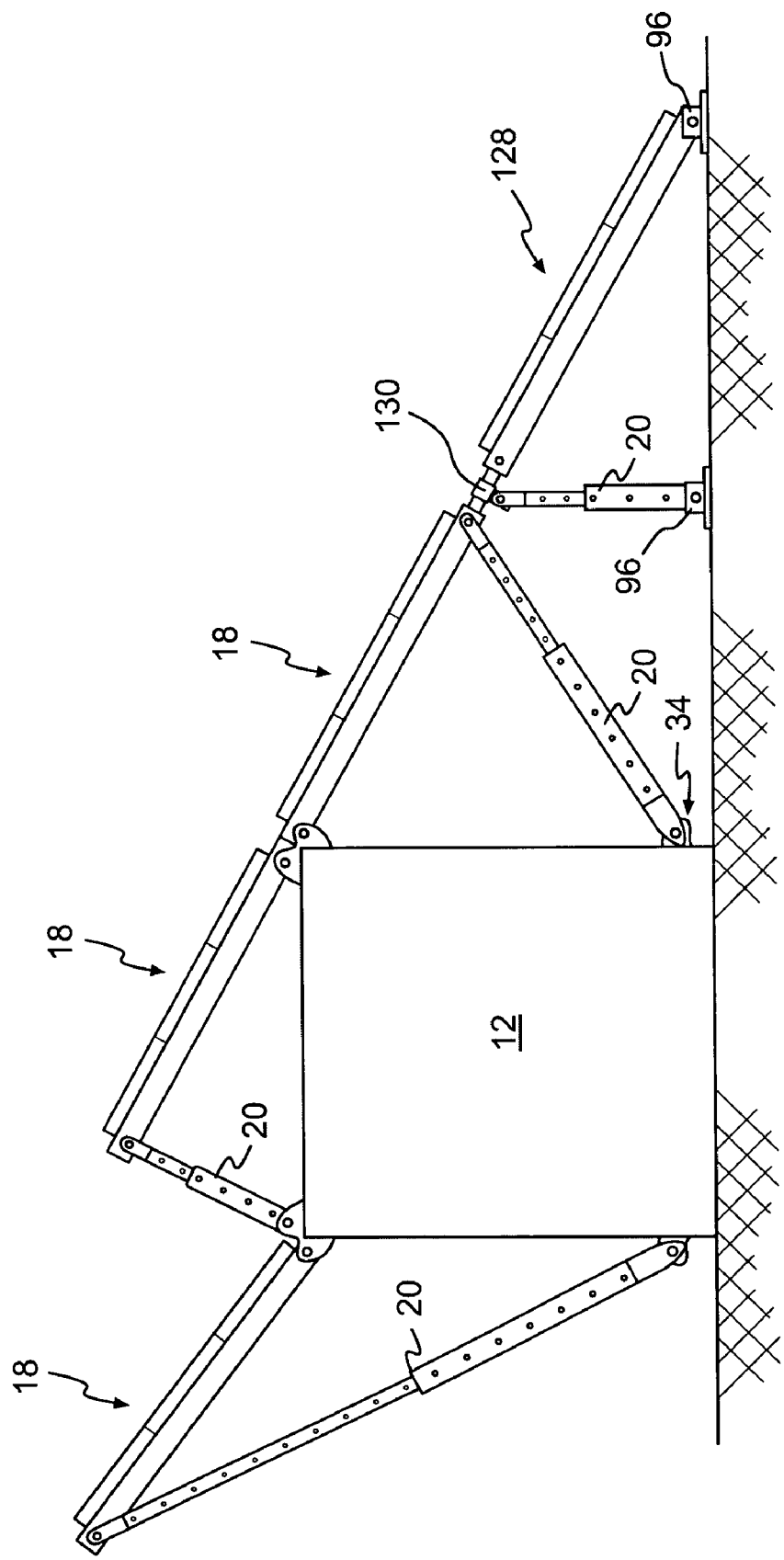
FIG. 12 illustrates an end view of a further mobile power system according to an embodiment of the present disclosure.
Figure 12A:
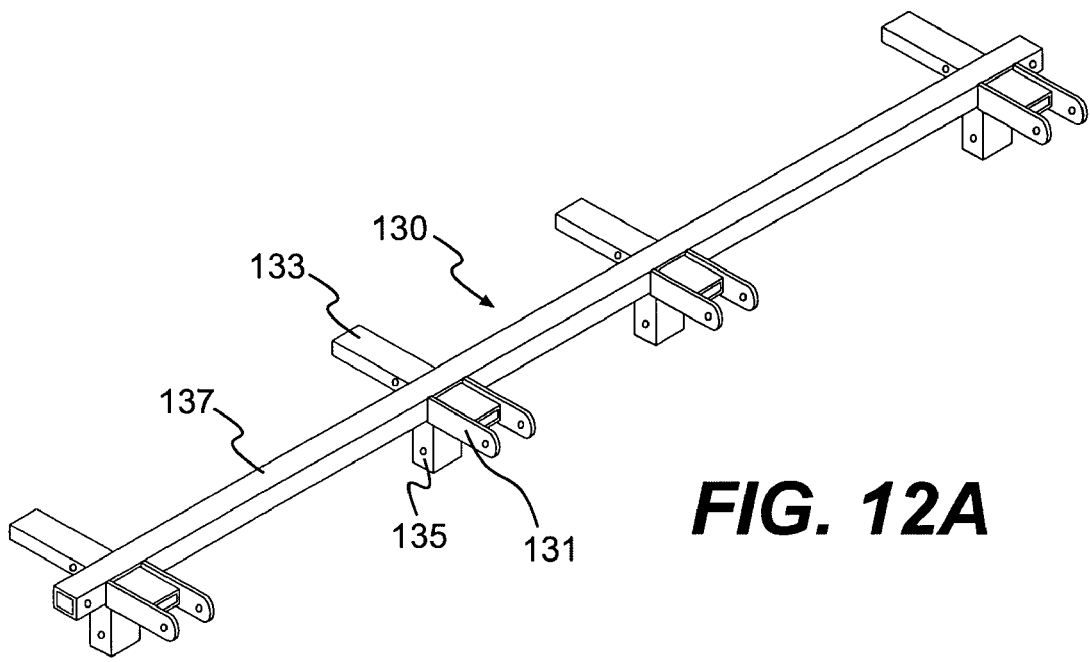
FIG. 12A illustrates a connection member of a mobile power system according to an embodiment of the present disclosure.

FIG. 12 illustrates that the mobile power system 10 may include supplemental solar panel arrays 128 extending from solar panel arrays 18. Solar panel arrays 128 may be identical to solar panel arrays 18 and thus interchangeable with solar panel arrays 18. Supplemental solar panel array 128 may be mechanically connected to solar panel arrays 18 by way of a connection member 130 forming a pivotable coupling between the supplemental solar panel array 128, the solar panel array 18, and the adjustable strut assembly 20. The connection member 130 may be of any conventional configuration. For example, as illustrated in FIG. 12A, connection member 130 may include a series of pivoting panel connectors 131, nonpivoting panel connectors 133, and strut connectors 135 all attached to a base member 137. Referring to FIG. 10, the nonpivoting panel connectors 133 may be coupled within support member 68 and provide a fixed, nonpivoting coupling therewith. A supplemental solar panel array 128 may then be coupled to the connection member 130 by connecting the pivoting panel connectors 131 to the support members 68 of the supplemental solar panel 128. This connection provides for a pivoting coupling between the connection member 130 and supplemental solar panel array 128. A strut assembly 20 may be coupled to the connection member 130 through strut connectors 135, thereby providing a pivoting coupling between the strut member 20 and connection member 130. It is noted that the supplemental solar panel arrays 128 may be electrically coupled to adjacent solar panel arrays in a serial manner extending to housing 12, or may include their own power output cords for coupling to the housing 12.

The availability of coupling supplemental solar panel arrays 128 to the mobile power system permits the user the option of tailoring the mobile power system 10 to a desired power output. It is understood that the number of supplemental solar panel arrays 128 coupled to the housing is restricted by the angular orientation of the arrays, but could be virtually unlimited if the supplemental solar panel arrays 128 were orientated in a generally horizontal plane.

Figure 13:
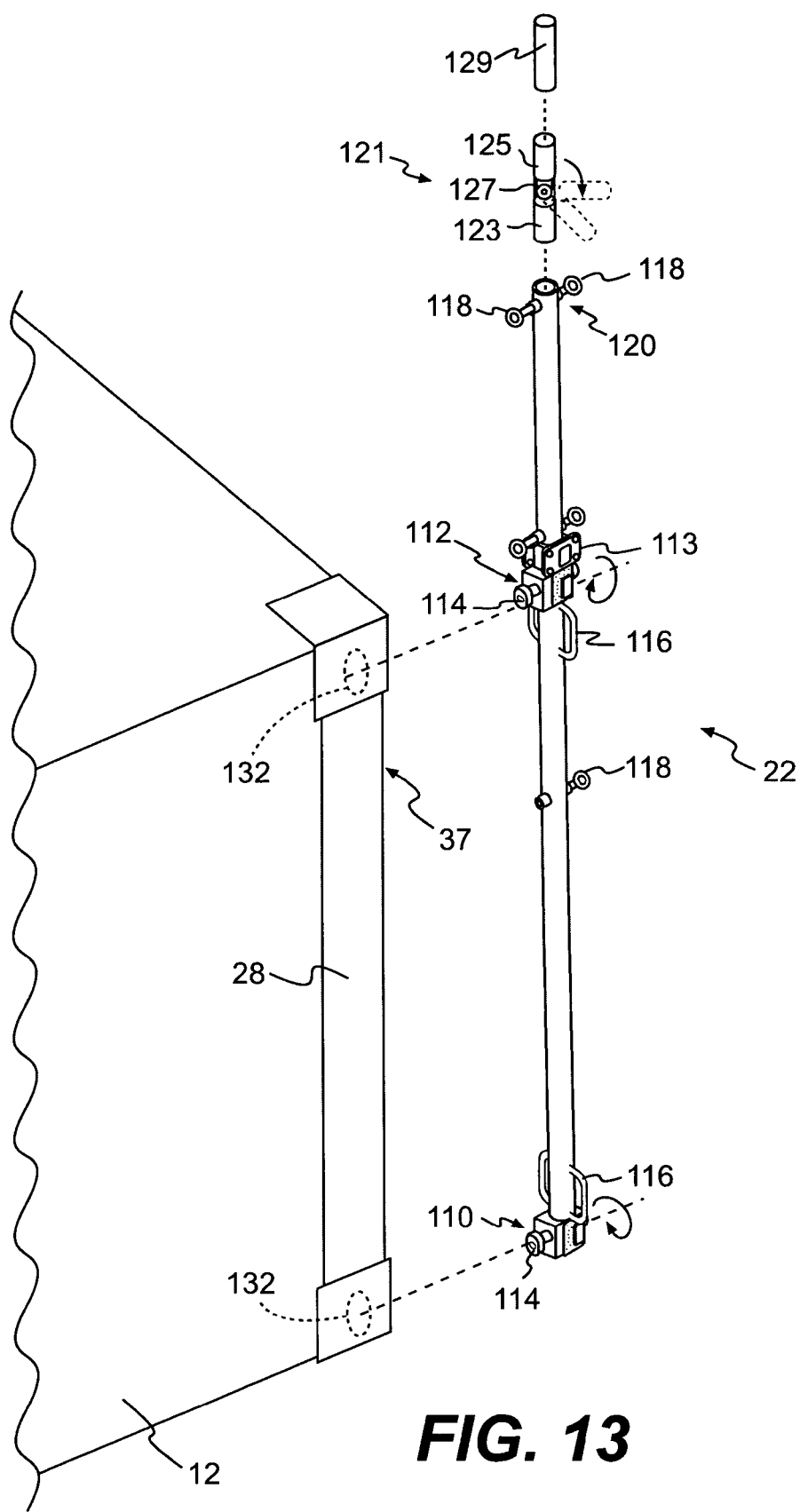
FIG. 13 illustrates an assembly view of a pole assembly of the mobile power system of FIG. 1.

The next step in assembling the mobile power system 10 is illustrated in FIG. 13, and includes coupling the vertical pole assembly 22 to the housing 12. This is achieved by aligning the rotatable cam members 114 of the pole connection assemblies 110, 112 so that cam members 114 can be inserted into the housing passages 132 formed in an end surface 37 of the housing 12. The cam members 114 may be, for example, oval shaped, and the housing passages 132 may have a complementary oval shape. Once the cam members 114 are aligned with the housing passages 132, the pole assembly 22 is introduced to the housing 12 so that the cam members 114 extend through the housing passages 132. At this point, each of the cam members 114 are rotated and secured in position so that they can no longer exit back through the housing passages 132. This provides for a rigid coupling of the pole assembly 22 to the housing 12.

Once the pole assembly 22 is secured to the housing 12, any of a number of components may be coupled to or within the top end portion 120 of the pole assembly 22. As noted above, such components may include a wind powered generating device 24, telecommunications equipment, speakers, lights, radar, flagpoles, video equipment, extension poles 129, and/or electrical or cable television lines. It is understood that more than one pole assembly 22 may be coupled to housing 12, and that the pole assemblies 22 may be coupled at various locations around the housing 12, in addition to, or other than, at the corner support pillars 28 of the housing 12.

According to one exemplary embodiment of this disclosure, and as noted above with respect to FIG. 9, a pivot connector 121 may be coupled to the top end portion 120 of the pole assembly 22. The pivot connector 121 may include a proximal end 123, a distal end 125, and a pivot joint 127 located between the proximal end 123 and distal end 125. The proximal end 123 of the pivot connector 121 may be sized to fit within the top end portion 120 of the pole assembly 22, and the distal end 125 of the pivot connector 121 may be sized to fit within the desired component to be coupled to the pole assembly 22, for example a pole extension 129 having a wind powered generating device 24 (FIG. 1), or other component, coupled thereto.

As illustrated in FIG. 13, the pivot connector 121 may be coupled to the top end portion 120 of the pole assembly 22 and pivoted so that the distal end 125 is angled down toward the ground. This position of the pivot connector 121 facilitates the coupling of the desired component to the pole assembly 22 from a location on the ground. Once the desired component is properly coupled to the distal end 125 of the pivot connector 121, the desired component is raised to a vertical orientation, and with it the distal end 125 of the pivot connector 121 into vertical alignment with the proximal end 123 of the pivot connector 121. It is understood that the proximal and distal ends 123, 125 of the pivot connector 121 may be locked into vertical alignment with any appropriate means, such as, for example, a unitary outer bracket (not shown) surrounding the proximal end 123, distal end 125, and pivot joint 127. Alternatively, pivot connector 121 may be welded or otherwise permanently fixed to the desired component, inserted into the top end portion 120 of the pole assembly 22 and the raised to a vertical orientation. In this assembly method, pivot connector 121 may be coupled so as to allow the pivot joint 127 to slide into the top end portion 120 as the desired component is raised to a vertical orientation. Locating the pivot joint 127 within the pole assembly 22 would serve to lock the pivot joint 127 in a vertical orientation.

Figure 14:
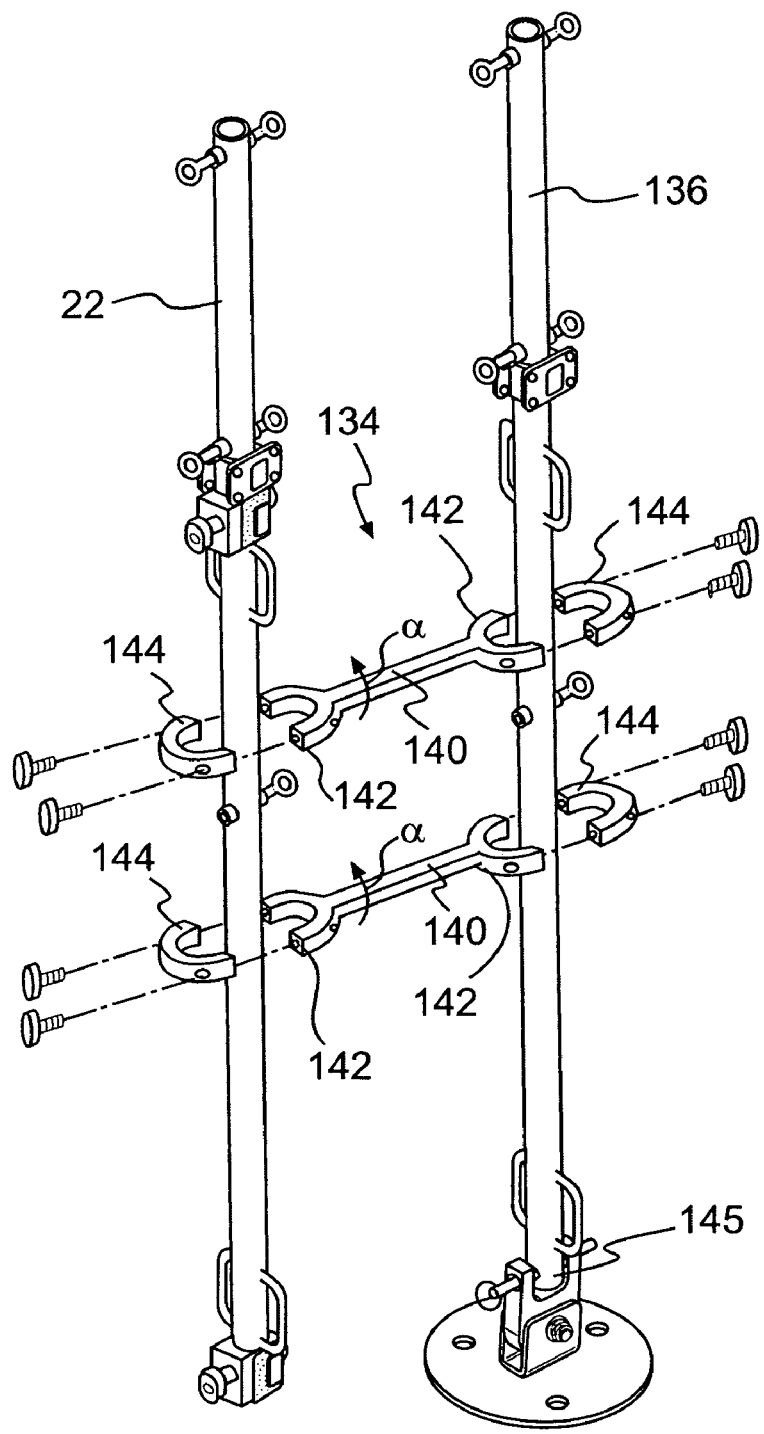
FIG. 14 illustrates a pole coupling assembly according to an embodiment of the present disclosure.

FIG. 14 illustrates a pole coupling assembly 134 for attaching supplemental pole assemblies 136 to the housing 12. Pole coupling assembly 134 may include a pair of coupling arms 140 having a "C" shaped flange 142 at each end. The "C" shaped flanges 142 may include fasteners for coupling to another "C" shaped flange of another coupling arm 140, or to a "C" shaped end connector 144. The supplemental pole assemblies 136 may be coupled to the housing 12 by first fastening an end connector 144 and coupling arm 140 to the pole assembly 22. The supplemental pole assembly 136 is then coupled to the open end of the coupling arm 140 using either another coupling arm 140, or another end connector 144. End connectors 144 and coupling arms 140 may be fastened together by any type of fastener or fasteners, for example, a plurality of bolt connections, as shown in FIG. 14. More than one coupling arm 140 may be used to connect the pole assembly 22 to the supplemental pole assembly 136, depending on the length of the coupling arms 140 and the forces acting on the supplemental pole assembly 136. Supplemental pole assemblies 136 may be generally identical to the pole assembly 22, or may be formed in another configuration. In addition, a bottom end 145 of supplemental pole assemblies 136 may include a foot member, for example foot member 96 (FIG. 8), for properly aligning the supplemental pole assemblies with the ground.

Figure 15:
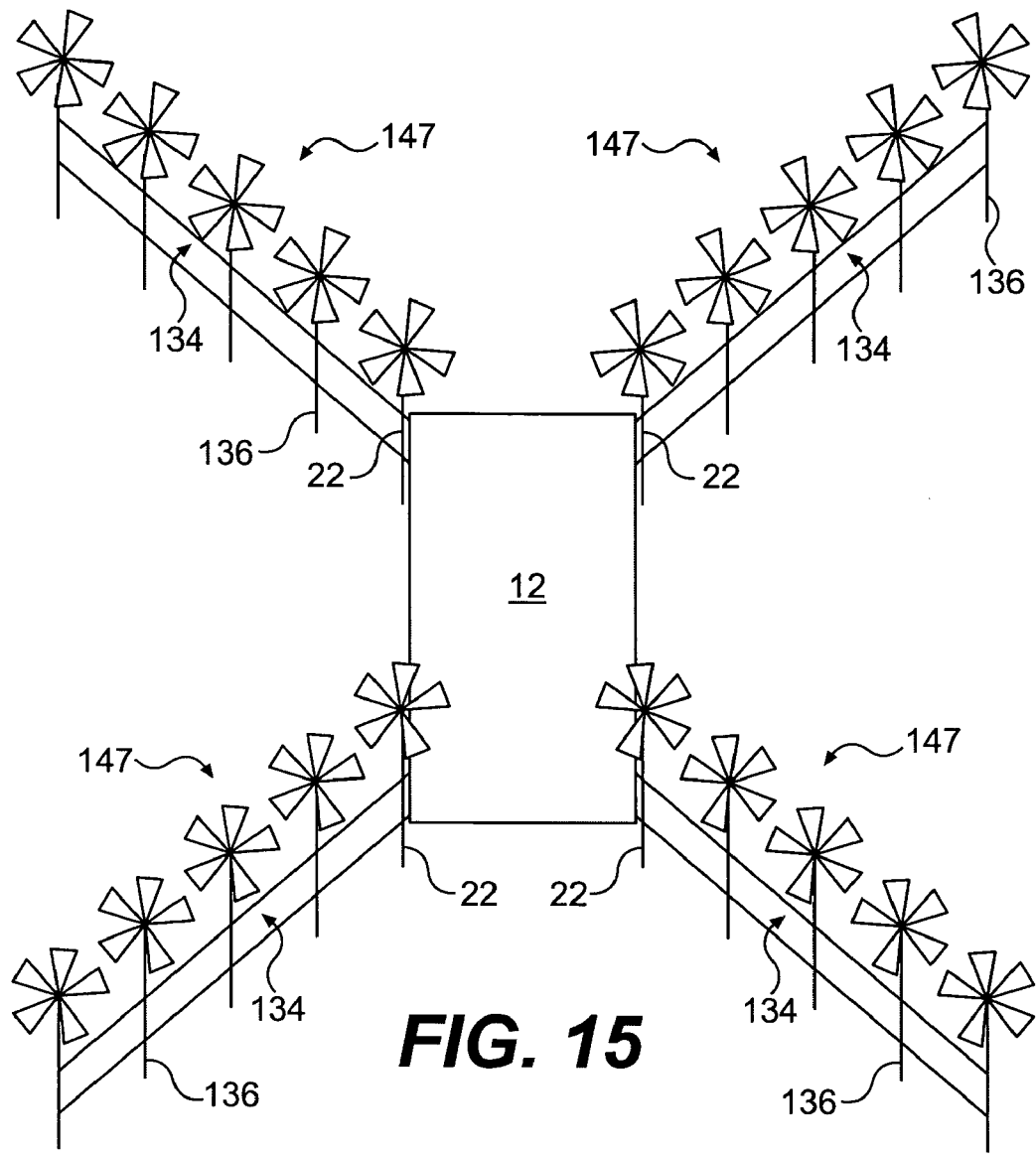
FIG. 15 schematically illustrates top view of a mobile power system according to an embodiment of the present disclosure.

As illustrated in FIG. 15, multiple supplemental pole assemblies 136 may be coupled in a series fashion to the pole assembly 22 to form an array of pole assemblies 147 extending from housing 12. Consequently, a number of wind powered generating devices 24, telecommunications equipment, speakers, lights, radar, flagpoles, video equipment, or a combination thereof, may be coupled to extend from the housing 12 of the mobile power system 10. The pole coupling assembly 134 with "C" shaped flanges 142 allows the supplemental pole assembly 136 to extend from the pole assembly 22, or another supplemental pole assembly 136, at any of a number of angles α. The angle of connection α may be selected to avoid certain terrain adjacent the mobile power system 10, or to form a more rigid linking of a plurality of supplemental pole assemblies 136. In addition, the pole coupling assembly 134 reduces the number of tie downs necessary to properly secure a supplemental pole assembly 136. This benefit is due to the rigid connection between the supplementary pole assemblies 136 and the housing 12 provided by the pole coupling assemblies 134.

Figure 16:
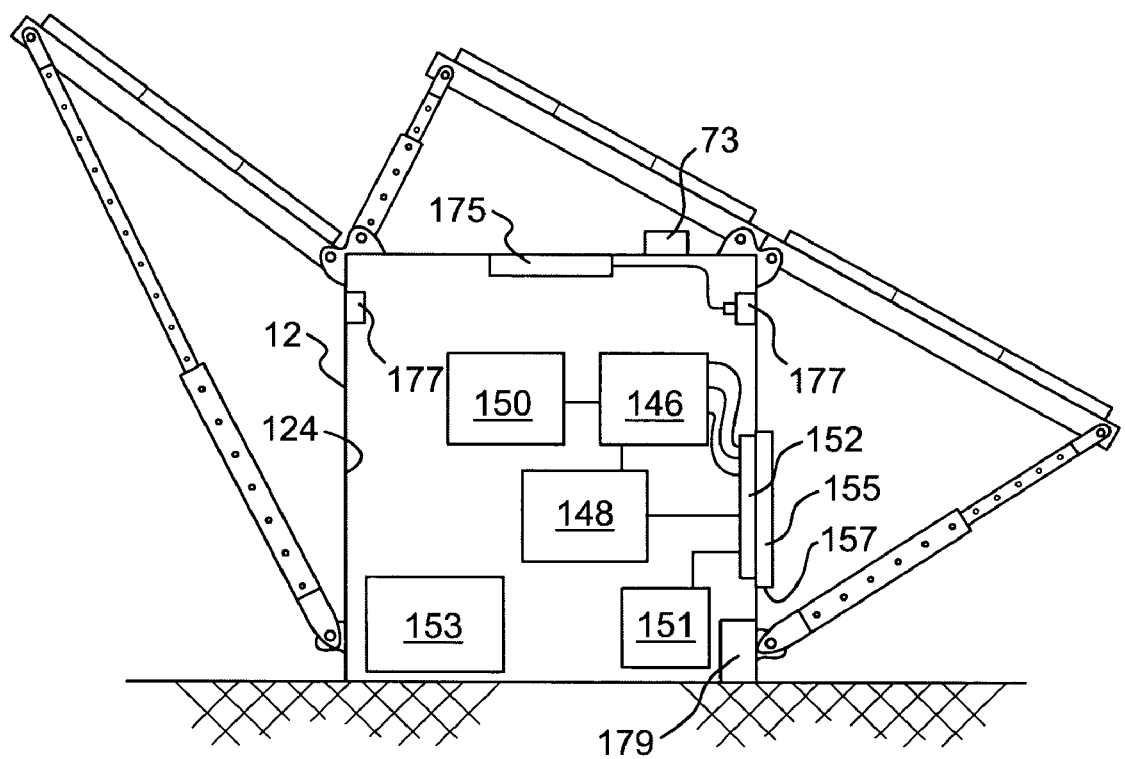
FIG. 16 schematically illustrates interior components of the housing of the mobile power system according to an embodiment of the present disclosure.

As described above in connection with FIG. 10, the interior compartment 124 of housing 12 may store the exterior and interior components of the mobile power system 10 during transport of the system. Interior components of the mobile power system 10 are illustrated in FIG. 16, and may include, for example, electronics and telecommunications equipment designed to, among other things, receive, store and convert the power received within the housing 12 from the solar and wind powered generating devices 18, 24, or other power supplying devices. Such equipment may include a combiner box 146 for combining the power received within the housing, one or more inverters 148 for converting various forms of direct current received within the housing 12 to various forms of alternating current, one or more batteries 150 for storing direct current received within the housing 12, and one or more power backup or baseload power units or equipment 151, such as a natural gas driven generator, oil driven generator, propane driven generator, diesel fuel driven generator, fuel cells, gasoline driven generator, or backup batteries. Alternatively, the power backup or baseload power units or equipment 151 may be located exterior to the housing 12 and electrically coupled to the housing 12 in any conventional manner. The electronics equipment may allow for the mobile power system to distribute power in a plurality of electrical configurations such as a plurality of different voltages of alternating current and a plurality of different voltages of direct current. As described below in connection with FIG. 17, the mobile power system 10 may provide a power interface by way of an external control panel 152 allowing for connection of a variety of load devices requiring different electrical configurations. For example, load devices requiring direct current, 120 volt alternating current, and/or 240 volt alternating current.

Additional components housed within interior compartment 124 may include other electronic devices 153, such as charge controllers, control systems, telecommunication systems, HVAC systems, lights, computer systems (including commercially available and/or custom designed software), remote control telecommunications system for remotely controlling or monitoring the mobile power system 10, self-powered biohazard and other hazard detection devices to detect hazards in other containers with which housing 12 travels in commerce (in such a use, the housing 12 may be configured externally to look like any other standard freight container), and alarm systems.

Figure 17:
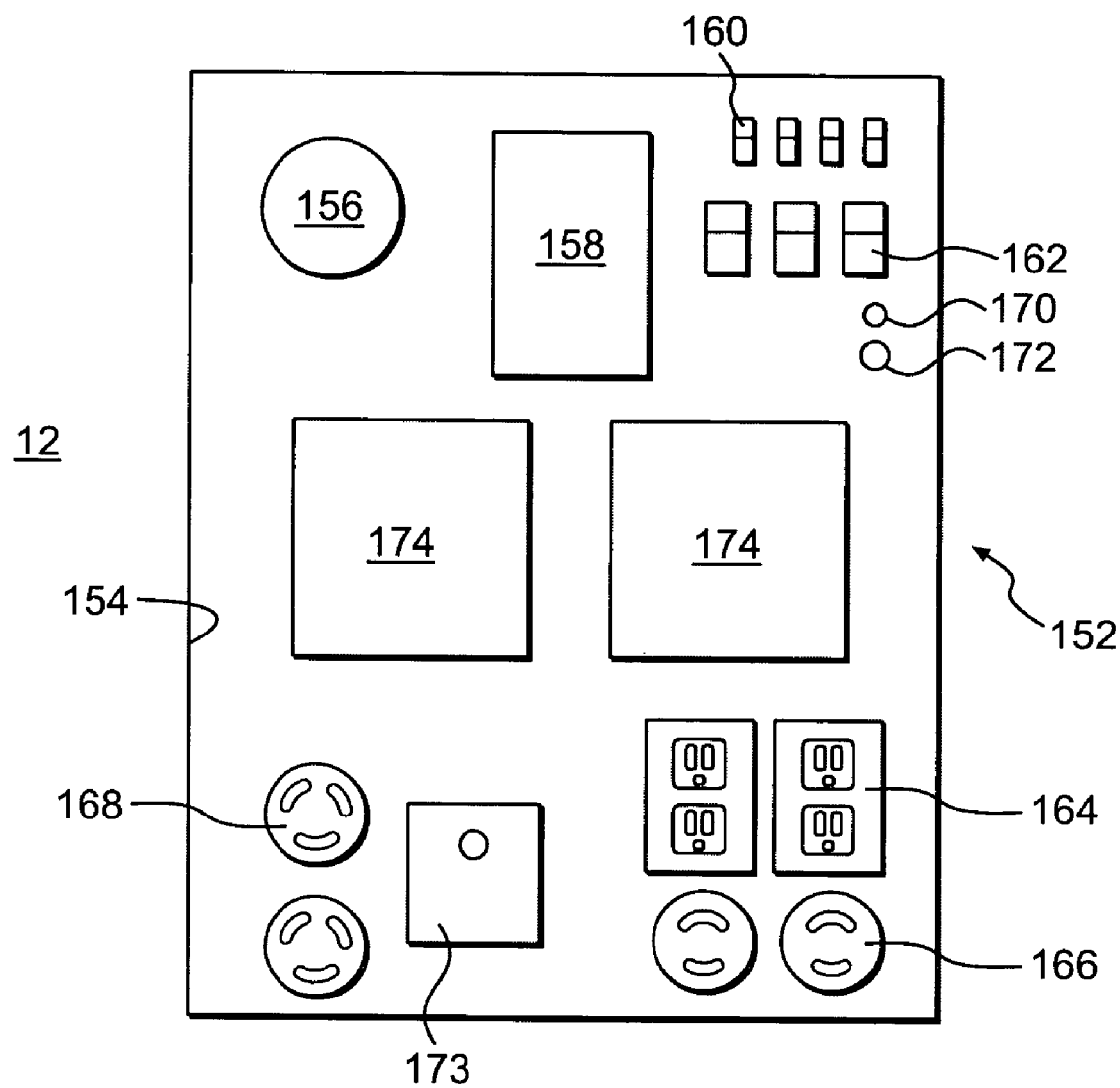
FIG. 17 illustrates a control panel of the mobile power system according to an embodiment of the present disclosure.

FIG. 17 illustrates the exterior control panel 152 for the mobile power system 10. The control panel 152 may be installed in a rectangular opening 154 formed in housing 12 prior to transportation of the housing, or, alternatively, the control panel 152 may be installed after the housing 12 has been delivered to a desired location. If the control panel 152 is installed after transportation of the housing 12, the rectangular opening in the housing 12 may be covered by a flat cover (not shown) during transportation so as to maintain a substantially flush surface on housing 12. Further, a weather shield 155 of any conventional design may be coupled to the housing 12 to protect the control panel 152 once it has been attached to the housing 12. For example, weather shield 155 may include a rectangular frame and hinged door assembly, wherein the door includes a bottom vertically aligned access opening 157.

Control panel 152 may include, for example, an air outlet 156 for ventilation of the interior compartment 124 of the housing 10, a telecommunications interface 158, one or more input connectors 160 for the solar powered generating devices 18, one or more input connectors 162 for the wind powered generating devices 24, one or more AC load output connectors 164 for supplying 120 VAC, one or more AC load output connectors 166 for supplying 240 VAC, and one or more AC inputs 168 for receiving 240 VAC from a gas/diesel generator or other source. In addition, control panel 152 may include one or more coax cable connections 170 for receiving or sending, among other things, cable television signals, one or more antennae input or output connections 172, one or more circuit breaker panels 174 having appropriate circuit breakers for the mobile power system 10, and one or more grid tie interfaces 173.

Once the exterior components have been removed from the interior compartment 124, the interior compartment 124 may be used for a variety of purposes. For example, the interior compartment 124 may be configured for use as a human shelter or for the storage of equipment, or both. When used as a human shelter, the interior compartment 124 may include equipment or furnishings corresponding to, for example, a medical or laboratory facility, emergency operations control center, office facility, or human dwelling. Such furnishings and equipment may include, for example, lights 175 (FIG. 16), phones, power strips with varying voltage plugs 177 (FIG. 16) and climate controllers such as heaters and air conditioners 179 (FIG. 16). To the extent that the furnishings and equipment require a supply of power, they may receive power from the solar and/or wind powered generating devices 18, 24, or any other power generating or power storing devices coupled to the housing 12. Further, the interior walls of the housing 12 may be insulated or otherwise modified to suit the intended use of interior compartment 124.

As noted, the interior compartment 124 of the housing 12 may merely provide for a secure storage of equipment. For example, interior compartment 124 could be used as a battery storage area. In such a use, the mobile power system 10 could be located along a remote route and used as a destination for replacing and/or recharging used batteries for future travel along the route. Regardless of the use, housing 12 may also include one or more interior doors (not shown) for providing rapid and secure access to the interior compartment 124, or portions thereof. Alternatively, the existing doors 26 (FIG. 2) of the housing 12 may be used as the primary access to the interior compartment 124.

INDUSTRIAL APPLICABILITY

The loading, transportation and use of the mobile power system 10 will now be described. Prior to delivery of the mobile power system 10, a determination may be made regarding the power output desired at a particular location, and the use of housing 12 once it has been delivered to the desired location. Based on these determinations or specifications, the housing 12 may be filled with stock from standardized parts to meet the desired power output (e.g. solar panel arrays 18, supplemental solar panel arrays 128, pole assemblies 22, supplemental pole assemblies 136, wind powered generating devices 24, brackets 14, adjustable strut assemblies 20, and foot members 96). Further, the interior compartment 124 may be configured for its desired use.

The standardized, modular nature of the mobile power system 10 enables the system to be at least partially assembled before the specific requirements of an end user are known. For example, several mobile power systems 10 may be assembled and inventoried for specific military or homeland security uses such as pumping water in remote locations or providing an emergency command and control center. When a request for a mobile power system 10 of a particular power output is received from a user, one or more of the mobile power systems 10 in inventory may be retrieved. Because of the modularity of the mobile power system 10, various components of the system may simply be removed or added to the inventoried mobile power system 10 to meet the particular power output requirements of the user. Thus, in certain instances such as an emergency need for power, a mobile power system 10 may be finally assembled and operational within a few hours of its arrival at the desired location.

Once the housing 12 has been filled with the appropriate exterior components and the interior compartment 124 has been configured for its intended use, the mobile power system 10 may be shipped to a desired location. The mobile power system may be delivered to locations to provide power to, for example, clinics, disaster relief and homeland security and military efforts, water pumping stations, office facilities, storage space, stand-alone buildings, emergency facilities, environmental monitoring facilities, security applications, and telecommunications facilities. Not only can the mobile power system 10 provide power for these and other facilities, but the mobile power system 10 may itself actually serve as any of these facilities by incorporating and integrating appropriate equipment or space within the housing 12 of the mobile power system 10. The mobile power system 10 may be located in remote areas where electric power is unavailable, at disaster or power blackout sites, or where electric power is available but unreliable or inadequate. Additionally, the mobile power system 10 may provide high quality power and green power sales into a power grid.

As noted above, the housing 12 may be in the form of a standard ISO freight container to facilitate shipment of the mobile power system 10. Also as noted above, to the extent that the standard freight container requires modification to serve as the housing 12 of the mobile power system 10, such modifications are not contrary to the required specifications of a standard ISO freight container.

Once the mobile power system 10 is delivered to a desired location, the station can be assembled as described above. While the weight and shape of the housing 12 protects against unintended movement of the power station, the housing may be further anchored at its desired location by way of, for example, a plurality of tie-down cables.

During operation, the mobile power system 10 may receive power within housing 12 in a variety of electrical configurations, such as varying voltages of direct current and varying voltages of alternating current. The mobile power system 10 may provide a power output of about 0.5 kW to about 50 kW, or more. Regardless of the electrical configuration of the power received, the internal components of the mobile power system are designed to transform and/or store the received power in a manner allowing for access to the power in a plurality of different electrical configurations. For example, mobile power system may provide access in the form of alternating current of varying voltages, and direct current of varying voltages.

Mobile power system 10 also allows for easy disassembly of the exterior components for further transportation of the mobile power system 10 to another desired location. The disassembled components may be again located within the interior compartment 124 of the housing 12 during transportation of the mobile power system 10.

Further uses of the mobile power system include electrically connecting a plurality of mobile power systems together to form a network for supplying or supplementing power to a community, to an existing power network, or for providing a remote power network for the military. In such a use, the remote control devices 153 mentioned above may be used to remotely monitor and control the mobile power system 10. Such remote control could be provided, for example, through a wireless connection, or other appropriate communication system.

The mobile power system 10 may serve as an environmentally benign source of both primary and backup power. Because in some configurations there are no emissions from the mobile power system 10, there would be no impact to the environment as a result of operating the mobile power system 10 of the present disclosure. Also, the solar and/or wind powered generating devices 16, 24 of the mobile power system 10 qualify as "green power" under government and other programs to provide tax and other incentives for increased supply of environmentally benign power.

Some of the benefits provided by the mobile power system 10 may be highlighted by analogy to the highly mobile, laptop personal computer. Laptop computers provide a base unit for easy and rapid coupling and decoupling of numerous different components, such as printers, displays, speakers, etc. In order to achieve this, the laptop computer includes a system of coupling assemblies to receive the different types of component connectors and different manufacturers' products. Accordingly, the laptop computer can be assembled into a variety of different configurations depending on the user's requirements and used in various locations.

Similar to the laptop personal computer and according to an embodiment of the present disclosure, the mobile power system 10 provides a base housing 12 configured to allow a number of different components by different manufacturers to be easily coupled thereto. This "open architecture" power station allows both different power input sources and different types of power outputs. As noted above, these components may include one or more of a solar powered generating device 16, wind powered generating device 24, natural gas driven generator, oil driven generator, propane driven generator, diesel fuel driven generator, fuel cells, gasoline driven generator, telecommunications equipment, speakers, lights, radar, flagpoles, video equipment, extension poles, and/or electrical or cable television lines. Thus, similar to the laptop computer, the mobile power system 10 may be easily transported to wherever it is needed, and configured in a "plug and play" fashion to include a number of different components by different manufacturers depending on the user's requirements.

In addition, the benefits associated with the capability of the mobile power system 10 to be connected to an electric power grid are analogous to the benefits of connecting a personal computer to a computer network. Namely, the connecting of the mobile power system 10 to an electric power grid enhances the capabilities of both the power grid and the mobile power system 10 commensurate to the capabilities of the other. For example, the mobile power system can be deployed close to the end user of electricity, thus relieving the overloading and congestion problems currently faced by electric transmission lines. This can help alleviate power blackouts, provide emergency power during blackouts, and, and provide a self-powered command and control center to deal with those blackouts.

Also, because the mobile power system is contained in a standard freight container and can be shipped in world commerce with millions of other containers each year, it has unique homeland security and military security advantages. When it is moving through the transportation system, such as on a ship or at a vulnerable port, it is ideally suited to serve as a stealth biohazard or other hazard detection station, detecting hazards in the other containers around it. This is done by having most or all of its power supplies, communications equipment, and hazard detection devices contained within the container's housing so that it blends in with other containers in commerce and its role as a detection container can go unnoticed and undetected.

Other embodiments of the invention will be apparent to those skilled in the art from consideration of the specification and practice of the invention disclosed herein. For example, the housing 12 of mobile power system 10 may include a cargo compartment of a shipping truck. The housing 12 may be configured as either a component that permanently attaches to a truck or trailer, or as a component that is removable from the truck or trailer. Additionally, the mobile power system 10 may be integrated with a smaller container that can be attached to a flat-bed truck or placed into the cargo space of a pickup truck. In addition, the mobile power system 10 may be integrated directly with a van or similar panel-type vehicle, a barge or other type of water vehicle, or integrated with a rail car or other type of locomotive vehicle. It is intended that the specification and examples be considered as exemplary only, with a true scope of the invention being indicated by the following claims.

What is claimed is:

1. A method of transporting and assembling a power station, comprising:
    storing a plurality of power generating devices and a plurality of coupling components within a housing, the housing including a modified standard ISO freight container, the plurality of power generating devices including at least two different types of power generating devices;
    transporting the housing to a desired location;
    removing the plurality of power generating devices and the plurality of coupling components from within the housing;
    coupling the plurality of power generating devices to an outer surface of the housing using the plurality of coupling components;
    receiving power from the plurality of power generating devices; and
    providing access to the received power.

2. The method of claim 1, further including accessing the received power in a plurality of different electrical configurations.

3. The method of claim 1 wherein the coupling of the plurality of power generating devices to the outer surface of the housing includes modifying the housing from a shipping condition.

4. The method of claim 1, further including detaching the plurality of power generating devices and coupling components from the housing to create a shipping condition within ISO standards for shipping.

5. The method of claim 1, wherein the storing of the plurality of power generating devices and the plurality of coupling components within the housing includes storing components necessary to couple the plurality of power generating devices to the outer surface of the housing.

6. The method of claim 1, further including utilizing the housing as a human shelter.

7. The method of claim 1, further including providing equipment for remotely controlling and monitoring at least one of the power generating devices.

8. The method of claim 1, wherein the coupling of the plurality of power generating devices to the outer surface of the housing includes electrically coupling the plurality of power generating devices to the outer surface of the housing.

9. A method of transporting and assembling a power station, comprising:
    storing a plurality of power generating devices and a plurality of coupling components within a housing, the plurality of power generating devices including at least two different types of power generating devices;
    transporting the housing to a desired location;
    removing the plurality of power generating devices and the plurality of coupling components from within the housing;
    coupling the plurality of power generating devices to an outer surface of the housing using the plurality of coupling components, the coupling of the plurality of power generating devices to the outer surface of the housing includes coupling a proximal end of at least one adjustable strut to one of the power generating devices and positioning a distal end of the at least one adjustable strut on the ground;
    receiving power from the plurality of power generating devices; and
    providing access to the received power.

10. The method of claim 9, wherein the coupling of the plurality of power generating devices to the outer surface of the housing includes electrically coupling the plurality of power generating devices to the outer surface of the housing.

11. A method of transporting and assembling a power station, comprising:
    storing a plurality of power generating devices and a plurality of coupling components within a housing, the plurality of power generating devices including at least two different types of power generating devices, at least one of the coupling components including at least one vertical pole coupled to a corner of the housing;

transporting the housing to a desired location;
removing the plurality of power generating devices and the plurality of coupling components from within the housing;
coupling the plurality of power generating devices to an outer surface of the housing using the plurality of coupling components;
receiving power from the plurality of power generating devices; and
providing access to the received power.

12. The method of claim 11, wherein the coupling of each power generating device to the outer surface of the housing includes attaching the at least one pole to a support located at the corner of the housing.

13. The method of claim 11, wherein the coupling of the plurality of power generating devices to the outer surface of the housing includes coupling at least one supplemental pole to the at least one pole, the at least one pole being positioned at a predetermined distance from the at least one supplemental pole by a pole coupling assembly.

14. The method of claim 13, wherein the coupling of the plurality of power generating devices to the outer surface of the housing includes coupling a wind power generating device to the at least one pole and the at least one supplemental pole.

15. A method of transporting and assembling a power station, comprising:
storing a plurality of power generating devices and a plurality of coupling components within a housing, the plurality of power generating devices including at least two different types of power generating devices, at least one of the power generating devices is a solar power generating device including first and second arrays of solar panels;
transporting the housing to a desired location;
removing the plurality of power generating devices and the plurality of coupling components from within the housing;
coupling the plurality of power generating devices to an outer surface of the housing using the plurality of coupling components, the coupling of the plurality of power generating devices to the outer surface of the housing includes coupling the second array of solar panels to the housing via the first array of solar panels;
receiving power from the plurality of power generating devices; and
providing access to the received power.

16. A method of transporting and assembling a power station, comprising:
storing a plurality of power generating devices and a plurality of coupling components within a housing, the plurality of power generating devices including at least two different types of power generating devices, the plurality of power generating devices includes at least one of a wind power generating device and a solar power generating device;
transporting the housing to a desired location;
removing the plurality of power generating devices and the plurality of coupling components from within the housing;
coupling the plurality of power generating devices to an outer surface of the housing using the plurality of coupling components, the coupling of the plurality of power generating devices to the outer surface of the housing includes coupling the plurality of power generating devices to the housing to extend in at least four different directions from the housing;
receiving power from the plurality of power generating devices; and
providing access to the received power.

17. A transportable power station, comprising:
a transportable housing, the housing including a modified standard ISO freight container; and
a plurality of power generating devices removably coupled to respective operational positions on an outside surface of the housing using a plurality of coupling components, the plurality of power generating devices and the plurality of coupling components being sized to fit completely within the transportable housing, and the plurality of power generating devices including at least two different types of power generating devices.

18. The transportable power station of claim 17, further including a plurality of different electrical outlets providing access to power in a plurality of different electrical configurations.

19. The transportable power station of claim 17, wherein the housing includes a shipping condition when the plurality of power generating devices and the plurality of coupling components are stored within the transportable housing.

20. The transportable power station of claim 17, wherein components necessary to couple the plurality of power generating devices to the outside surface of the housing are sized to fit completely within the housing.

21. The transportable power station of claim 17, wherein the transportable housing is a human shelter.

22. The transportable power station of claim 17, wherein the plurality of power generating devices are coupled directly to at least three locations on the housing.

23. The transportable power station of claim 22, wherein:
the plurality of power generating devices includes at least one of a wind power generating device and a solar power generating device; and
the plurality of power generating devices extends in at least four different directions from the housing.

24. The transportable power station of claim 17, further including equipment for remotely controlling and monitoring at least one of the power generating devices.

25. The transportable power station of claim 17, wherein the plurality of coupling components includes at least one coupling component configured to electrically couple at least one of the power generating devices to the outside surface of the housing.

26. A transportable power station, comprising:
a transportable housing;
a plurality of power generating devices removably coupled to respective operational positions on an outside surface of the housing using a plurality of coupling components, the plurality of power generating devices and the plurality of coupling components being sized to fit completely within the transportable housing, and the plurality of power generating devices including at least two different types of power generating devices; and
at least one adjustable strut including a proximal and distal end, the proximal end being coupled to one of the power generating devices, and the distal end being positioned on the ground.

27. A transportable power station, comprising:
a transportable housing; and
a plurality of power generating devices removably coupled to respective operational positions on an outside surface of the housing using a plurality of coupling components, the plurality of power generating devices and the plurality of coupling components being sized to fit completely within the transportable housing, and the plurality of power generating devices including at least two different types of power generating devices, at least one of the coupling components including at least one vertical pole coupled to a corner of the housing.

28. The transportable power station of claim 27, wherein the at least one pole is attached to a support located at the corner of the housing.

29. The transportable power station of claim 28, wherein the support is a support pillar located at the corner of the housing.

30. The transportable power station of claim 27, further including at least one supplemental pole coupled to the at least one pole, the at least one pole being positioned at a predetermined distance from the at least one supplemental pole by a pole coupling assembly.

31. The transportable power station of claim 30, wherein the plurality of power generating devices includes a wind power generating device coupled to the at least one pole and the at least one supplemental pole.

32. A transportable power station, comprising:
a transportable housing; and
a plurality of power generating devices removably coupled to respective operational positions on an outside surface of the housing using a plurality of coupling components, the plurality of power generating devices and the plurality of coupling components being sized to fit completely within the transportable housing, and the plurality of power generating devices including at least two different types of power generating devices, at least one of the power generating devices being a solar power generating device including first and second arrays of solar panels, the second array of solar panels being coupled to the housing via the first array of solar panels.

33. A method of producing and delivering power at a desired location, comprising:
coupling a wind power generating device to an outer surface of a transportable housing, the transportable housing being a modified freight container;
coupling a solar power generating device to the outer surface of the transportable housing;
wherein the coupling of the wind and solar power generating devices to the outer surface of the transportable housing includes:
coupling the wind and solar power generating devices to the outer surface of the transportable housing using a plurality of coupling components, the plurality of coupling components including at least one vertical pole,
coupling the at least one pole to at least one corner of the transportable housing, and
coupling the wind power generating device to the at least one pole;
receiving power from the wind and solar power generating devices;
detaching the wind and solar power generating devices from the transportable housing;
storing the wind and solar power generating devices and the plurality of coupling components within the transportable housing, the storing including storing components necessary to couple the wind and solar power generating devices to the outer surface of the transportable housing; and
transporting the transportable housing to a desired location.

34. The method of claim 33, further including providing access to the received power in a plurality of different electrical configurations.

35. The method of claim 33, further including utilizing the transportable housing as a human shelter.

36. The method of claim 33, wherein the coupling of the wind and solar power generating devices to the outer surface of the housing includes coupling the plurality of power generating devices to the housing to extend in at least four different directions from the housing.

37. The method of claim 33, wherein the plurality of coupling components includes at least one coupling component configured to electrically couple at least one of the power generating devices to the outside surface of the housing.

* * * * *